United States Patent [19]

Fujita et al.

[11] Patent Number: 4,947,734
[45] Date of Patent: Aug. 14, 1990

[54] METHOD OF DUTY-RATIO CONTROL FOR HYDRAULICALLY ACTUATED SLIP CONTROL LOCK-UP CLUTCH AND TRANSMISSION

[75] Inventors: Kenjiro Fujita, Kusatsu; Tetsuo Ozaki, Gamagoori; Takeo Hiramatsu, Nagaokakyo, all of Japan

[73] Assignee: Mitsubishi Jidosha Kogyo Kabushiki Kaisha, Tokyo, Japan

[21] Appl. No.: 180,169

[22] Filed: Apr. 11, 1988

[30] Foreign Application Priority Data

Apr. 20, 1987 [JP] Japan .................. 62-97020
Mar. 18, 1988 [JP] Japan .................. 63-65037

[51] Int. Cl.$^5$ .................. B60K 41/02; B60K 41/04; B60K 41/22; F16H 61/14
[52] U.S. Cl. .................. 91/471; 91/429; 91/459; 74/867; 192/3.29; 192/3.3; 192/3.31
[58] Field of Search .................. 192/3.28, 3.29, 3.30, 192/82 T, 85 R, 3.31; 91/429, 459, 461, 471; 137/596.16; 74/866, 867

[56] References Cited

U.S. PATENT DOCUMENTS

| | | | |
|---|---|---|---|
| 3,754,482 | 8/1973 | Sanders et al. | 74/752 A |
| 4,253,480 | 3/1988 | Kessel et al. | 137/102 |
| 4,428,467 | 1/1984 | Hiramatsu | 192/3.31 |
| 4,468,488 | 9/1984 | Hiramatsu | 192/82 T X |
| 4,509,124 | 4/1985 | Suzuki et al. | 192/3.28 X |
| 4,572,338 | 2/1986 | Miki | 192/3.29 |
| 4,582,185 | 4/1986 | Grimes et al. | 192/3.3 X |
| 4,588,059 | 5/1986 | Miki et al. | 192/3.28 |
| 4,589,537 | 5/1986 | Nishikawa et al. | 192/3.3 X |
| 4,664,235 | 5/1987 | Yokoyama et al. | 192/3.29 |
| 4,732,245 | 3/1988 | Hiramatsu | 192/3.3 X |
| 4,768,632 | 9/1988 | Moan | 192/3.29 X |
| 4,768,635 | 9/1988 | Sakurai et al. | 192/3.3 X |
| 4,779,489 | 10/1988 | Haley | 192/82 T X |
| 4,781,279 | 11/1988 | Georg | 192/3.3 |

FOREIGN PATENT DOCUMENTS

| | | | |
|---|---|---|---|
| 153798 | 9/1985 | European Pat. Off. | 192/3.3 |
| 2553515 | 6/1976 | Fed. Rep. of Germany . | |
| 3502276 | 7/1986 | Fed. Rep. of Germany . | |
| 3616974 | 11/1987 | Fed. Rep. of Germany . | |
| 2293736 | 7/1978 | France . | |
| 39353 | 4/1981 | Japan | 192/3.28 |
| 54768 | 4/1982 | Japan | 192/3.29 |
| 196464 | 10/1985 | Japan | 192/3.3 |
| 2138174 | 10/1984 | United Kingdom . | |

*Primary Examiner*—Edward K. Look
*Assistant Examiner*—George Kapsalas
*Attorney, Agent, or Firm*—Frishauf, Holtz, Goodman & Woodward

[57] ABSTRACT

A hydraulic control method which includes a step of changing the time rate of introduction per a predetermined unit time of pressurized oil into an oil passage connected to a hydraulically-operated load device, such as a clutch of an automatic transmission, from a first time rate to a second time rate, thereby changing the time-based average oil pressure inside the oil passage from a first oil pressure value to a second oil pressure value. The time rate of introduction of the pressurized oil into the oil passage is changed from the first time rate to the second time rate via a third pressurized oil introduction time rate corresponding to a third oil pressure value different from the first and second oil pressure values. If the second oil pressure value is greater than the first oil pressure value, the third pressurized oil introduction time rate is substantially 100%. If the second pressure value is smaller than the first, the third time rate is substantially 0%. Preferably, the step of pressurized oil introduction into the oil pressure at the third pressurized oil introduction time rate is followed by at least one step of introducing the pressurized oil into the oil passage at a pressurized oil introduction time rate corresponding to an oil pressure value different from the third oil pressure value. Preferably, the pressurized oil introduction time rates are temperature-corrected in accordance with the pressurized oil temperature.

6 Claims, 30 Drawing Sheets

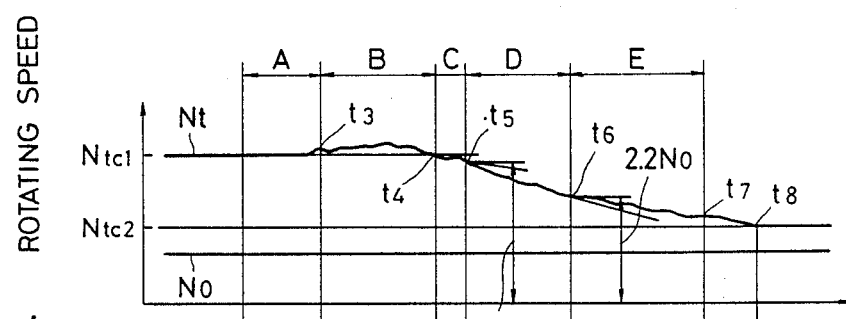
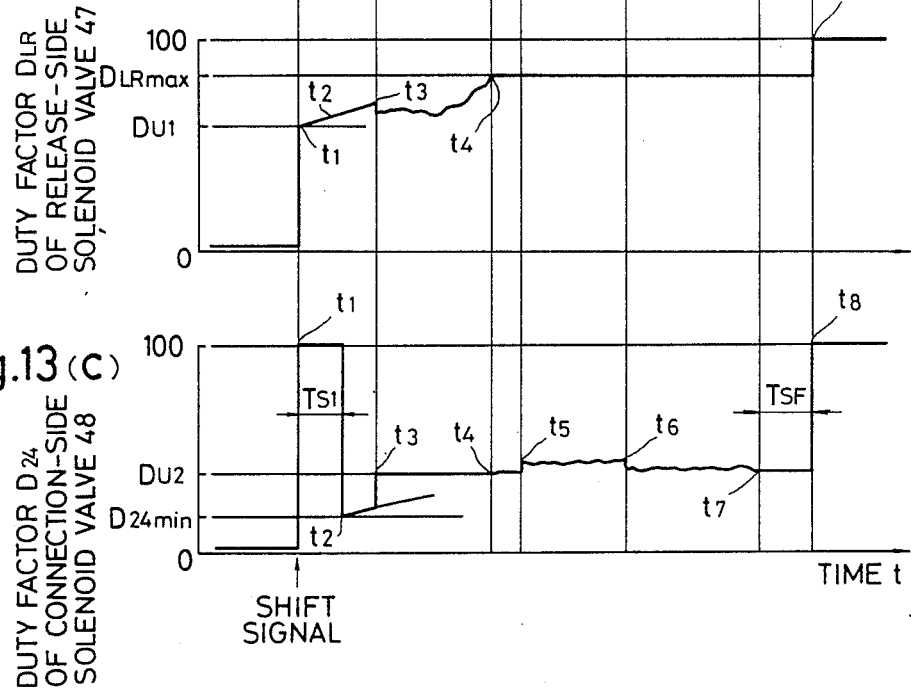
Fig.13 (a)
Fig.13 (b)
Fig.13 (c)

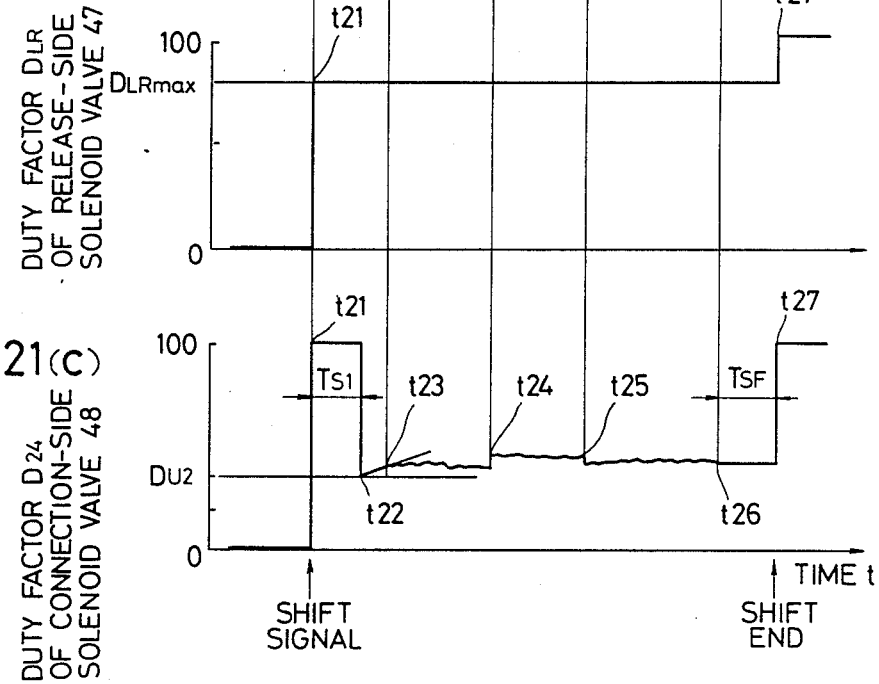

METHOD OF DUTY-RATIO CONTROL FOR HYDRAULICALLY ACTUATED SLIP CONTROL LOCK-UP CLUTCH AND TRANSMISSION

BACKGROUND OF THE INVENTION

The present invention relates to a hydraulic control method for a hydraulically-operated load device, and more particularly, to a hydraulic control method conducive to the improvement of the hydraulic responsiveness of electrical/hydraulic converters, such as duty-controlled solenoid valves, used in an automatic transmission.

Duty-controlled solenoid valves are widely used as electrical/hydraulic converters in various hydraulic control circuits which include, for example, transmission control clutches and brakes of vehicular automatic transmissions. These solenoid valves serve to keep constant the ratio (duty factor) between the pressurized oil introduction and discharge periods of an oil passage system, which connects with the clutches or other hydraulically-operated load devices, thereby setting the time-based average pressure of the oil passage system, i.e., the operating oil pressure supplied to the load devices, to a desired pressure level corresponding to the constant duty factor. Conventionally, there have been the following problems to be solved in varying the duty factor of one such solenoid valve to change the oil pressure of the oil passage system from a first value to a second value.

If the duty factor of the solenoid valve is directly changed from a first duty factor, corresponding to the first pressure value, to a second duty factor, corresponding to the second pressure value, in order to change the oil pressure from the first value to the second, the oil pressure inside the piping system cannot be increased following such a change of the duty factor, on account of the resiliency of the piping system. Moreover, the solenoid valve is repeatedly turned on and off with the set duty factor. When increasing the oil pressure inside the oil passage system, therefore, the discharge period for the pressurized oil becomes an idle period. When lowering the oil pressure, on the other hand, the oil introduction period is rendered idle. Owing to this principle of control, it takes much time to attain the oil pressure corresponding to the specified duty factor (second duty factor). This electrical/hydraulic response delay, as it is called, may sometimes raise problems on the control of clutch operation and the like.

SUMMARY OF THE INVENTION

The principal object of the present invention is to provide a hydraulic control method, capable of minimizing the aforementioned delay in electrical-hydraulic responsiveness during the change of an oil pressure supplied to a hydraulically-operated load device, thereby improving the hydraulic responsiveness.

Another object of the present invention is to provide a hydraulic control method, permitting the improvement of the hydraulic responsiveness without entailing a shock attributable to the change of the oil pressure supplied to the hydraulically-operated load device.

According to an aspect of the present invention, there is provided a hydraulic control method which includes a step of changing the time rate of introduction per a predetermined unit time of pressurized oil into an oil passage connected to a hydraulically-operated load device from a first time rate to a second time rate, thereby changing the time-based average oil pressure inside the oil passage from a first oil pressure value to a second oil pressure value greater than the first oil pressure value.

The time rate of introduction of the pressurized oil into the oil passage is changed from the first time rate to the second time rate via a third pressurized oil introduction time rate corresponding to a third oil pressure value greater than the first and second oil pressure values.

According to another aspect of the present invention, there is provided a hydraulic control method which includes a step of changing the time rate of introduction per a predetermined unit time of pressurized oil into an oil passage connected to a hydraulically-operated load device from a first time rate to a second time rate, thereby changing the time-based average oil pressure inside the oil passage from a first oil pressure value to a second oil pressure value smaller than the first oil pressure value.

In this case, the time rate of introduction of the pressurized oil into the oil passage is changed from the first time rate to the second time rate via a third pressurized oil introduction time rate corresponding to a third oil pressure value smaller than the first and second oil pressure values.

Preferably, if the second oil pressure value is greater than the first oil pressure value, the third pressurized oil introduction time rate is substantially 100%. If the second pressure value is smaller than the first, the third time rate is substantially 0%.

Preferably, moreover, the step of pressurized oil introduction into the oil pressure at the third pressurized oil introduction time rate is followed by at least one step of introducing the pressurized oil into the oil passage at a pressurized oil introduction time rate corresponding to an oil pressure value different from the third oil pressure value, so that the pressurized oil is introduced into the oil passage at the second pressurized oil introduction time rate after the following step.

Preferably, furthermore, the pressurized oil introduction time rates are corrected in accordance with the pressurized oil temperature.

The above and other objects, features, and advantages of the invention will be more apparent from the ensuing detailed description taken in connection with the accompanying drawings.

BRIEF DESCRIPTION OF THE DRAWINGS

FIGS. 8 to 12 are flow charts illustrating processes of hydraulic control executed in a power-on up-shift mode by means of the transmission control unit (TCU) 16;

FIGS. 13(a), 13(b) and 13(c) are timing charts showing time-based transitions of a turbine speed Nt and the transfer drive gear speed No and transitions of the respective duty factors of release- and connection-side solenoid valves, used in the power-on up-shift mode;

FIGS. 21(a), 21(b) and 21(c) are timing charts showing time-based transitions of the turbine speed Nt and the transfer drive gear speed No and transitions of the respective duty factors of the release- and connection-side solenoid valves, used in the power-off up-shift mode;

DETAILED DESCRIPTION

Figure 1:
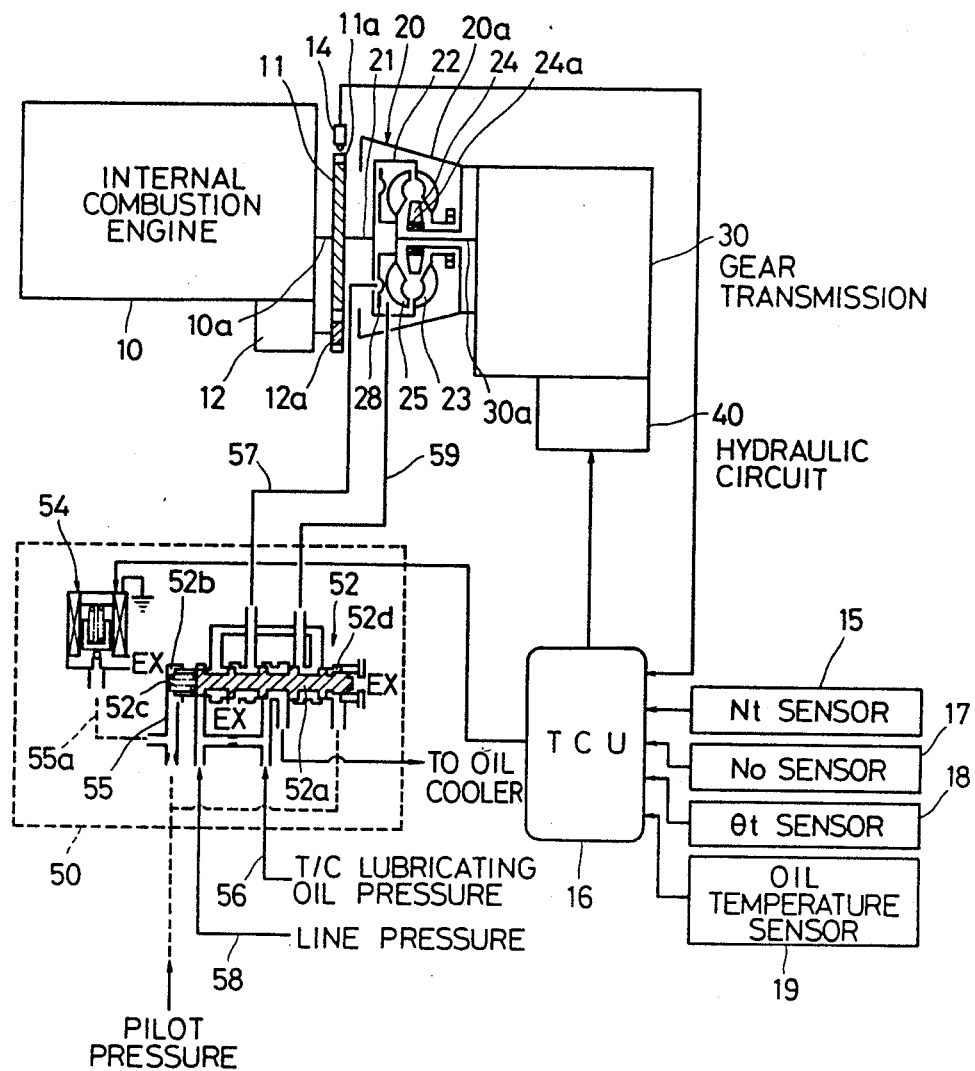
FIG. 1 is a block diagram showing an outline of an automatic transmission with a torque converter, to which the present invention is applied.

FIG. 1 shows an outline of an electronically-controlled automatic vehicular transmission with a torque converter according to the present invention. In FIG. 1, an internal combustion engine 10, which is e.g. a 6-cylindered engine, has a crankshaft 10a fitted with a flywheel 11. One end of a drive shaft 21 of a torque converter 20, for use as a driving force transmission device, is coupled mechanically to the crankshaft 10a via the flywheel 11. The torque converter 20 includes a casing 20a, a pump 23, a stator 24, and a turbine 25. The pump 23 is coupled to the other end of the drive shaft 21 through an input casing 22 of the converter 20, and the stator 24 is coupled to the casing 20a by means of a one-way clutch 24a. The turbine 25 is connected to an input shaft 30a of a gear transmission 30.

In the present embodiment, the torque converter 20 is provided with a direct-coupled clutch of a slip-type, e.g., a damper clutch 28, which is disposed between the input casing 22 and the turbine 25. Even when it is engaged or directly coupled, the damper clutch 28 allows a suitable slip between the pump 23 and the turbine 25 of the torque converter 20 which are coupled mechanically and directly to each other. The slippage of the damper clutch 28, i.e., the torque transmitted through the clutch 28, is externally controlled by means of a hydraulic damper clutch control circuit 50.

The hydraulic damper clutch control circuit 50 includes a damper clutch control valve 52 and a damper clutch control solenoid valve 54. The solenoid valve 54 is a normally-closed on-off valve, whose solenoid 54a is connected electrically to a transmission control unit (hereinafter referred to simply as TCU) 16. The damper clutch control valve 52 serves to change an oil passage for operating oil to be supplied to the damper clutch 28, and to control the oil pressure acting on the clutch 28. To attain this, the control valve 52 is composed of a spool 52a and a spring 52c. The spring 52c is contained in a left-end chamber 52b, fronted by the left end face, as illustrated, of the spool 52a, and serves to urge the spool 52a to the right of FIG. 1. The left-end chamber 52b is connected with a pilot oil passage 55 which communicates with a pilot hydraulic source (not shown). The pilot oil passage 55 is connected with a branch passage 55a which extends to the drain side. The solenoid valve 54 is located in the middle of the branch passage 55a. The level of a pilot oil pressure supplied to the left-end chamber 52b is controlled as the solenoid valve 54 is opened or closed. The pilot oil pressure from the pilot hydraulic source is also supplied to a right-end chamber 52d which is fronted by the right end face of the spool 52a.

When the pilot oil pressure acts on the left-end chamber 52b to cause the spool 52a of the damper clutch control valve 52 to move to the right limit position, a torque converter (T/C) lubricating oil pressure, supplied to the torque converter 20, is fed through an oil passage 56, the control valve 52, and the oil passage 57 into a hydraulic chamber, which is defined between the input casing 22 and the damper clutch 28. Thereupon, the damper clutch 28 is disengaged. On the other hand, when the pilot oil pressure is not fed into the left-end chamber 52b so that the spool 52a moves to the left limit position as illustrated, a line pressure from a hydraulic pump (not shown) is fed through an oil passage 58, the control valve 52, and an oil passage 59 into an oil chamber, which is defined between the damper clutch 28 and the turbine 25. Thus, the damper clutch 28 is frictionally engaged with the input casing 22. When the duty factor (the ratio of the on-time of the solenoid valve to the duty cycle time) Dc of the damper clutch solenoid valve 54 is controlled by means of the TCU 16, the spool 52a is moved to the position where the resultant force of the urging force of the spring 52c and the pilot oil pressure acting on the left-end chamber 52b balances with the urging force of the pilot oil pressure acting on the right-end chamber 52d. An oil pressure corresponding to the moved position is supplied to the damper clutch 28, whereby a transmission torque Tc of the clutch 28 is adjusted to a required value.

Figure 2:
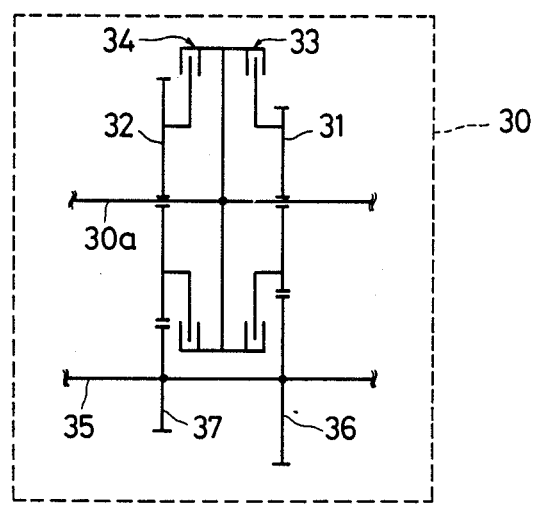
FIG. 2 is a gear train diagram showing part of the internal arrangement of a gear transmission 30 shown in FIG. 1.

The gear transmission 30 includes a gear train adapted for four forward gear ratios and one backward gear ratio, for example. FIG. 2 is a diagram showing part of the arrangement of the gear transmission 30. First and second driving gears 31 and 32 are loosely fitted on the input shaft 30a for rotation, and hydraulic clutches 33 and 34, for use as frictional engagement elements for transmission control, are fixed to that portion of the input shaft 30a between the driving gears 31 and 32. The driving gears 31 and 32 are adapted to rotate in one with the input shaft 30a when they engage the clutches 33 and 34, respectively. An intermediate transmission shaft 35, which extends parallel to the input shaft 30a, is connected to a driving axle by means of a final reduction gear system (not shown). The intermediate transmission shaft 35 is fixedly fitted with first and second driven gears 36 and 37, which are in mesh with the first and second driving gears 31 and 32, respectively. When the clutch 33 engages the first driving gear 31, the rotation of the input shaft 30a is transmitted to the clutch 33, first driving gear 31, first driven gear 36, and intermediate transmission gear 35. Thus, a first transmission control mode (e.g., first gear ratio mode) is established. Whem the clutch 34 engages the second driving gear 32 after the clutch 33 is disengaged, the rotation of the input shaft 30a is transmitted to the clutch 34, second driving gear 32, second driven gear 37, and intermediate transmission shaft 35. Thus, a second transmission control mode (e.g., second gear ratio mode) is established.

Figure 3:
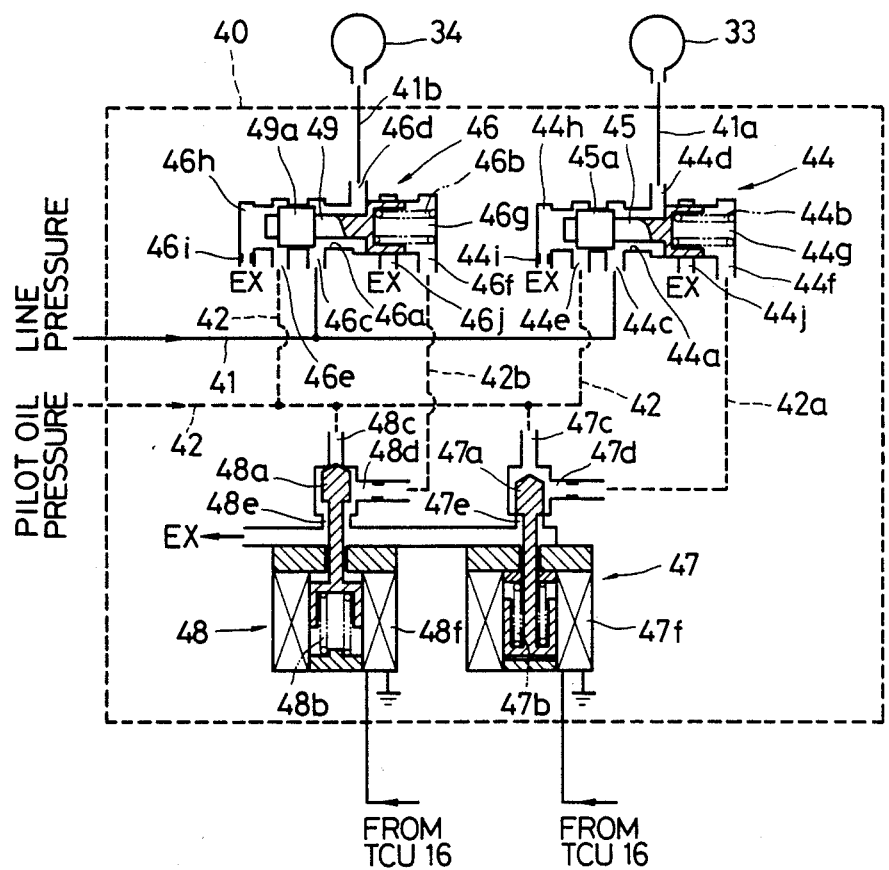
FIG. 3 is a hydraulic circuit diagram showing part of the internal arrangement of a hydraulic circuit 40 shown in FIG. 1.

FIG. 3 shows a hydraulic circuit 40 which supplies oil pressure to the hydraulic clutches 33 and 34. The hydraulic circuit 40 includes first and second hydraulic control valves 44 and 46 and solenoid valves 47 and 48. Spools 45 and 49 are slidably fitted in bores 44a and 46a of the first and second hydraulic control valves 44 and 46, respectively. Thus, right-end chambers 44g and 46g are defined which are fronted by the respective right end faces of the spools 45 and 49. Springs 44b and 46b, which are contained in the chambers 44g and 46g, respectively, urge their corresponding spools 45 and 49 to the right of FIG. 3. The first and second hydraulic control valves 44 and 46 are formed, respectively, with left-end chambers 44h and 46h which are fronted by the respective left end faces of the spools 45 and 49. These chambers 44h and 46h communicate with the drain side by way of orifices 44i and 46i, respectively.

The solenoid valve 47 is a normally-open three-way valve which has three ports 47c, 47d and 47e. The valve 47 is composed of a valve plug 47a, a spring 47b, and a solenoid 47f. The spring 47b serves to urge the valve plug 47a toward the port 47e, thereby closing the port 47e. When the solenoid 47f is excited, it causes the valve plug 47a to move toward the port 47c against the urging force of the spring 47b, thereby closing the port 47c. The solenoid valve 48, on the other hand, is a normally-closed three-way valve which has three ports 48c, 48d and 48e. The valve 48 is composed of a valve plug 48a, a spring 48b, and a solenoid 48f. The spring 48b serves to urge the valve plug 48a toward the port 48c, thereby closing the port 48c. When the solenoid 48f is excited, it causes the valve plug 48a to move toward the port 48e against the urging force of the spring 48b, thereby closing the port 48e. The respective solenoids 47f and 48f of the solenoid valves 47 and 48 are connected to the output side of the TCU 16.

An oil passage 41, which extends from the aforesaid hydraulic pump (not shown), is connected to ports 44c and 46c of the first and second hydraulic control valves 44 and 46. One end of an oil passage 41a is connected to a port 44d of the first hydraulic control valve 44, and the hydraulic clutch 33 is connected to the other end of the oil passage 41a. One end of an oil passage 41b is connected to a port 46d of the second hydraulic control valve 46, and the hydraulic clutch 34 is connected to the other end of the oil passage 41b. An oil passage 42, which extends from the aforesaid pilot hydraulic source (not shown), is connected to ports 44e and 46e, communicating with the left-end chambers 44h and 46h of the first and second hydraulic control valves 44 and 46, respectively, and also to the ports 47c and 48c of the solenoid valves 47 and 48, respectively. The ports 47d and 48d of the solenoid valves 47 and 48 are connected, respectively, to ports 44f and 46f which communicate with the right-end chambers 44g and 46g of the first and second hydraulic control valves 44 and 46 by means of pilot oil passages 42a and 42b, respectively. The ports 47e and 48e of the solenoid valves 47 and 48 communicate with the drain side.

The oil passage 41 is used to supply the first and second hydraulic control valves 44 and 46 with an operating oil presure or line pressure, which is adjusted to a predetermined level by means of a pressure-regulating valve (not shown) or the like. The pilot oil passage 42 is used to supply the first and second hydraulic control valves 44 and 46 and the solenoid valves 47 and 48 with a pilot oil pressure, which is adjusted to a predetermined level by means of another pressure-regulating valve (not shown) or the like.

When the spool 45 of the first hydraulic control valve 44 moves to the left of FIG. 3, a land 45a of the spool 45, having so far been closing the port 44c, allows the port 44c to open, so that the operating oil pressure is fed to the clutch 33 through the oil passage 41, the ports 44c and 44d, and the oil passage 41a. When the spool 45 moves to the right, the port 44c is closed by the land 45a, while the port 44d communicates with a drain port 44j, so that the oil pressure inside the clutch 33 is discharged to the drain side. When the spool 49 of the second hydraulic control valve 46 moves to the left of FIG. 3, a land 49a of the spool 49, having so far been closing the port 46c, allows the port 46c to open, so that the operating oil pressure is fed to the clutch 34 through the oil passage 41, the ports 46c and 46d, and the oil passage 41b. When the spool 49 moves to the right, the port 46c is closed by the land 49a, while the port 46d communicates with a drain port 46j, so that the oil pressure inside the clutch 34 is discharged to the drain side.

Returning to FIG. 1, a ring gear 11a is fitted on the outer periphery of the flywheel 11, and is in mesh with a pinion 12a of a starter 12. The ring gear 11a has a predetermined number of teeth (e.g., 110 teeth), and an electromagnetic pickup (hereinafter referred to as Ne sensor) 14 is opposed to the ring gear 11a. The Ne sensor 14, which is used to detect the rotational speed Ne of the engine 10, as described in detail later, is connected electrically to the input side of the TCU 16.

A turbine speed sensor (Nt sensor) 15, a transfer drive gear speed sensor (No sensor) 17, a throttle valve opening sensor ($\theta$t sensor) 18, an oil temperature sensor 19, etc. are also connected to the input side of the TCU 16. The Nt sensor 15 and the No sensor 17 are used to detect the respective speeds Nt and No of the turbine 25 of the torque converter 20 and a transfer drive gear (not shown). The $\theta$t sensor 18 serves to detect the opening $\theta$t of throttle valve (not shown) which is disposed in the middle of suction passage (not shown) of the engine 10. The oil temperature sensor 19 is used to detect the temperature Toil of the operating oil discharged from a hydraulic pump (not shown). Detection signals from these sensors are supplied to the TCU 16.

The operation of the gear transmission with the aforementioned construction will now be described.

The TCU 16 contains therein memories, such as a ROM, RAM, etc., central processing unit, I/O interface, counter, and the like. The TCU 16 performs hydraulic control for the transmission control in the following manner, in accordance with a program stored in the memories.

Figure 4:
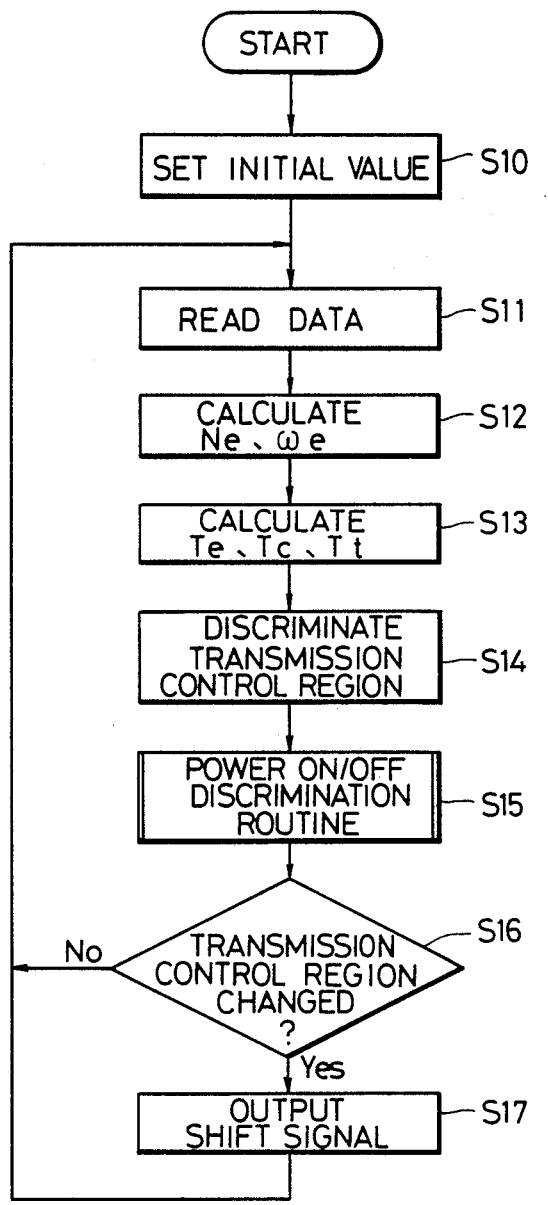
FIG. 4 is a flow chart for a main routine illustrating hydraulic control processes executed during transmission control by means of a transmission control unit (TCU) 16 shown in FIG. 1.

The TCU 16 repeatedly executes a main program routine shown in FIG. 4 with a predetermined cycle, e.g., 35-Hz cycle. In this main program routine, various initial values, as mentioned later, are first read or set in step S10. Then, the TCU 16 reads and stores therein the detection signals from the various sensors, including the Ne sensor 14, Nt sensor 15, No sensor 17, $\theta$t sensor 18, and oil temperature sensor 19 (step S11). Thereafter, the TCU 16 calculates and stores necessary parameter values for the transmission control, based on the detection signals, in the following manner.

Figure 5:
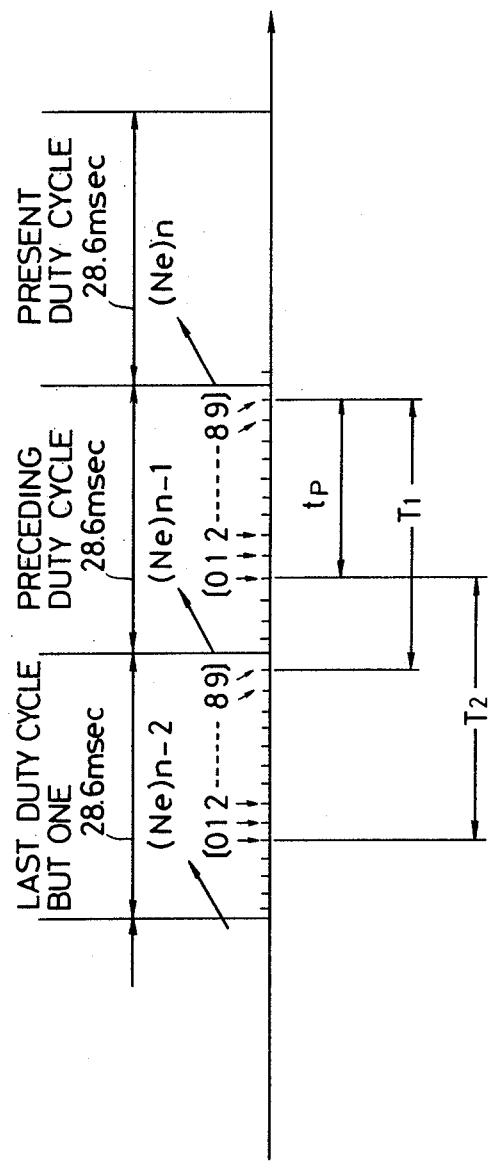
FIG. 5 is a timing chart illustrating the way pulse signals from an engine speed (Ne) sensor 14, used to calculate an engine speed Ne, are produced.

First, the TCU 16 calculates the engine speed Ne and its changing rate $\omega$e on the basis of the detection signal from the Ne sensor 14 (step S12). The Ne sensor 14 delivers one pulse signal to the TCU 16 every time it detects four of the teeth of the ring gear 11a during one revolution of the gear 11a. Then, TCU 16 measures the period of time tp (sec) required for the detection of the last 9 pulses out of those pulse signals which are supplied during one duty cycle, i.e., in 28.6 msec (35 Hz), as shown in FIG. 5. Thereafter, the TCU 16 calculates the engine speed Ne (rpm) in accordance with the following equation (1), and stores the memories with the obtained value as an engine speed $(Ne)_n$ for the present duty cycle.

$$Ne = (9 \times 4) \div 110 \div tp \times 60 \qquad (1)$$
$$= 216 \div (11 \times tp).$$

Based on an engine speed $(Ne)_{n-1}$ stored in the last duty cycle and the engine speed $(Ne)_n$ stored in the present duty cycle, the engine speed changing rate $\omega$e (rad/sec$^2$) is calculated as follows and then stored:

$$\omega e = \Delta Ne \times 2\pi \div 60 \div T \qquad (2)$$
$$= (\pi/30T) \times \Delta Ne.$$

where there are relations $\Delta Ne = (Ne)_n - (Ne)_{n-1}$ and $T = (T1+T2)/2$, and T1 and T2 are periods of time (sec) between the respective count end points of the periods tp in the last and present duty cycles and between the respective count start points thereof, respectively.

Calculation of Turbine Shaft Torque Tt

Then, the TCU 16 proceeds to step S13, and calculates the net torque Te of the engine and the torque (hereinafter referred to as turbine shaft torque) Tt (kg. m) of the output shaft of the torque converter.

The relationship of the friction torque Tb of the clutch on the release or connection side, obtained during the transmission control, to the turbine shaft torque Tt and the turbine speed changing rate $\omega$t during the transmission control may be given as follows:

$$Tb = a \times Tt + b \times \omega t \qquad (A1)$$

where a and b are constants which depend on the shift pattern (type of transmission control), such as shiftup from first gear ratio to second or shift-down from fourth gear ratio mode to third, the moments of inertia of various rotating parts, etc. As seen from equation (A1), the clutch friction torque Tb, that is, the operating oil pressure for the clutches 33 and 34, can be set without receiving the influences of lowering of the engine performance, change of engine water temperature, etc., if it is determined on the basis of the turbine shaft torque Tt and the turbine speed changing rate $\omega$t. Empirical formulas and data obtained in consideration of these circumstances may be readily applied to engines of different types.

If the turbine speed changing rate $\omega$t is expected to be subjected to feedback control for a target value, despite the change of the turbine shaft torque Tt, what is required is not to correct the deviation of the changing rate $\omega$t from the target value afterward, but to increase or decrease the friction torque Tb, i.e., the operating oil pressure of the clutches 33 and 34, by a margin corresponding to the variation of the turbine shaft torque Tt. By doing this, stable transmission control can be effected with high followup performance, without requiring any substantial correction gain for feedback control.

If the time-based change of the turbine shaft torque Tt at the start of the generation of the friction torque of the connection-side clutch can be estimated at the start of the transmission control, the clutch friction torque can be changed while controlling the turbine speed changing rate $\omega$t around the target value, in accordance with equation (A1). Therefore, such a change of the torque Tt is empirically obtained in advance. Based on empirical data thus obtained, the change of the turbine shaft torque Tt, at the start of the actual generation of the torque of the connectionside clutch, is estimated. By applying the estimated value to equation (A1), the oil pressure supplied to the clutch can be adjusted to change the friction torque Tb so that the target value of the turbine speed changing rate $\omega$t can be obtained according to equation (A1). By doing this, the turbine speed changing rate $\omega$t can be accurately controlled around the target value from the start of the generation of the friction torque of the connection-side clutch.

Thus, the feeling of operation for the transmission control can be improved.

Thereupon, the turbine shaft torque Tt is calculated according to equation (4), using the net engine torque Te calculated according to equation (3), and these calculated values are stored in the memories:

$$Te = C \times Ne^2 + I_E \times \omega e + Tc \qquad (3)$$

$$\begin{aligned} Tt &= t(Te - Tc) + Tc \\ &= t(C \times Ne^2 + I_E \times \omega e) + Tc \end{aligned} \qquad (4)$$

Here Te is a net torque which is obtained by subtracting the friction loss, oil pump driving torque, etc. from an average torque produced by the explosion of the engine 10, and C is a torque capacity coefficient, which is read from a torque converter characteristic table, previously stored in the memories, in accordance with the ratio e (=Nt/Ne) of the turbine speed Nt to the engine speed Ne. After the speed ratio e is first calculated according to the turbine speed Nt, detected by means of the Nt sensor 14, and the engine speed Ne detected in the aforesaid manner, the torque capacity coefficient C is read from the memories in accordance with the calculated speed ratio e, $I_E$ is the moment of inertia of the engine 10, which is a fixed value set for each engine type, and t is a torque ratio, which is also read from the aforesaid torque converter characteristic table in accordance with the speed ratio e (=Nt/Ne).

Tc is the transmission torque of the damper clutch 28, which, in the direct-coupled clutch of this slip type, is given by $$\begin{aligned} Tc &= Pc \times A \times r \times \mu \\ &= a1 \times Dc - b1, \end{aligned} \qquad (5)$$

where Pc, A, r, and $\mu$ are the supplied oil pressure, piston pressure receiving area, friction area, and coefficient of friction, respectively, of the damper clutch 38. Equation (5) can be obtained because the supplied oil pressure Pc of the damper clutch 28 is proportional to the duty factor Dc of the damper clutch solenoid valve 54. In equation (5), a1 and b1 are constants which are set according to the shift mode. The value Tc calculated by equation (5) is effective only if it is positive. It it is negative, Tc is regarded as Tc=0.

The instantaneous values of the net engine torque Te and the turbine shaft torque Tt, calculated and stored in this manner, can be calculated substantially determinately on the basis of the engine speed Ne detected by the Ne sensor 14, the turbine speed Nt detected by the Nt sensor 15, and the duty factor Dc of the damper clutch solenoid valve 54. As seen from equations (3) and (4), moreover, the engine output torque Te is calculated including the term ($I_E \times \omega e$), so that it hardly receives the influence of the turbine speed changing rate $\omega t$ or friction torque Tb. Therefore, if the friction torque Tb is adjusted, that is, if the supplied pressure of the clutch is adjusted, in order to set the changing rate $\omega t$ to the target value, the turbine shaft torque Tt never changes. Thus, these two torques cannot interfere with each other, and therefore, never entail any uncontrollable situations. In the middle of the transmission control, in particular, if the friction torque Tb is adjusted so as to correct variation of the turbine shaft torque Tt, which is caused by disturbance attributable to acceleration work or the like, the aforesaid interference cannot be entailed.

Thus, the transmission control can be performed with satisfactory responsiveness.

Figure 6:
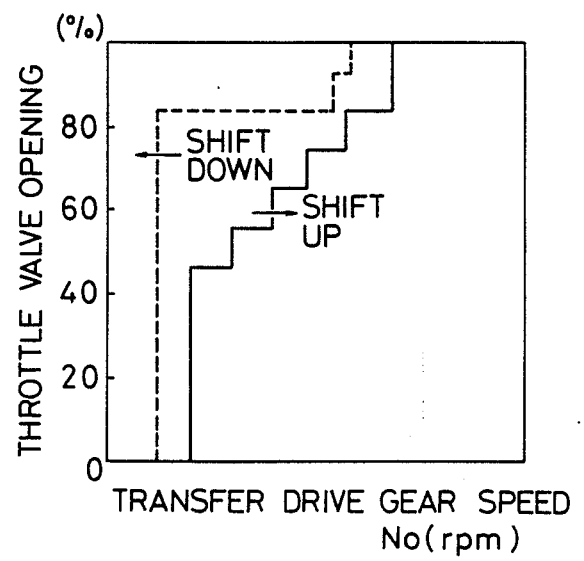
FIG. 6 is a shift map showing transmission control regions defined by a throttle valve opening and a transfere drive gear speed No.

Then, in step S14, the TCU 16 determines the transmission gear ratio mode to be established in the gear transmission 30, on the basis of the opening $\theta t$ of the throttle valve and the transfer drive gear speed No. FIG. 6 shows transmission control regions for the first transmission control mode (hereinafter referred as first gear ratio mode) and the second transmission control mode (hereinafter referred to as second gear ratio mode) one grade higher than the first mode. In FIG. 6, the full line represents a boundary line between the regions for the first and second gear ratio modes, provided for the shift-up operation from the first gear ratio mode to the second. The broken line represents a boundary line between the first and second gear ratio mode regions provided for the shift-down operation from the second gear ratio mode to the first. The TCU 16 determines the transmission gear ratio mode to be established according to the shift map of FIG. 6, and stores the memories with the predetermined mode in advance.

Power On/Off Discrimination

Figure 7:
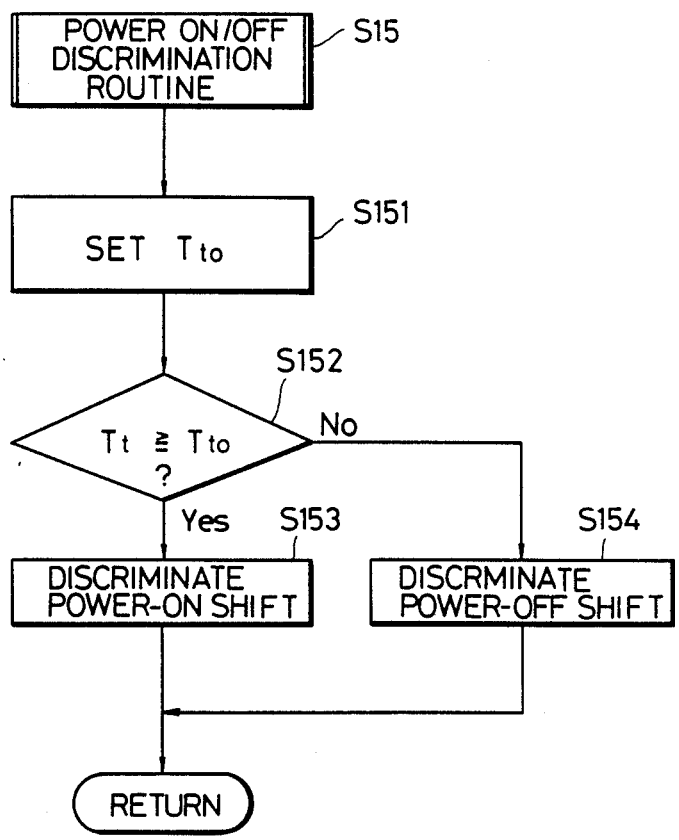
FIG. 7 is a flow chart of a power on/off decision routine executed by means of the transmission control unit (TCU) 16.
Figure 8:
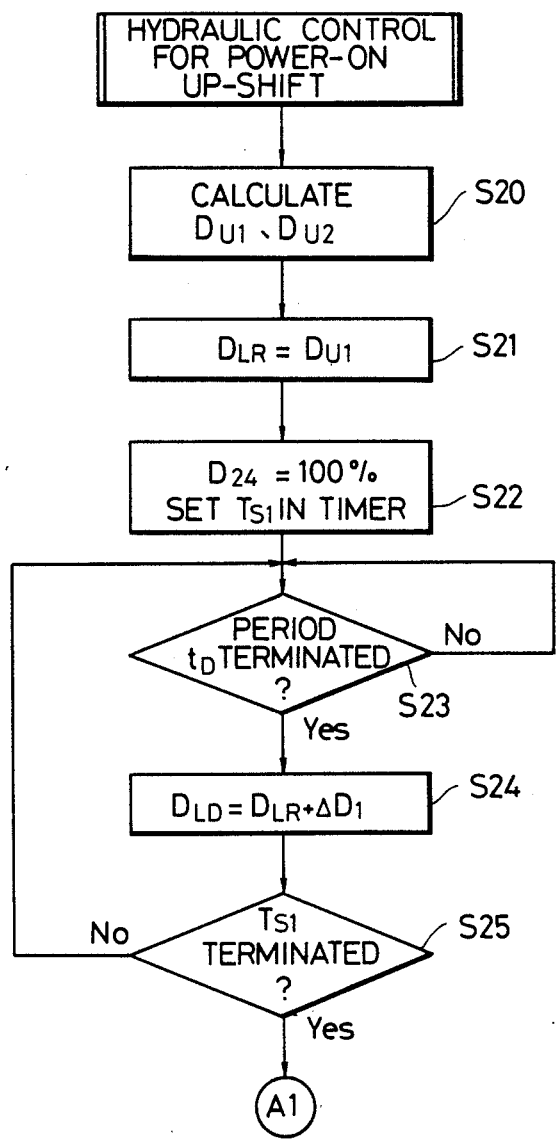

Then, the TCU 16 proceeds to step S15, and executes a power on/off discrimination routine. FIG. 7 is a flow chart showing this routine. First, a discrimination value Tto is set in step S151. The value Tto is calculated as follows:

$$Tto = a2 \times \omega to = 2\pi \times a2 \times Ni \qquad (6)$$

where a2 and Ni are predetermined values previously set in accordance with the shift pattern. The values a2 and Ni are negative in an up shift mode and positive in a down-shift mode. Then, the TCU 16 determines whether the turbine shaft torque Tt, calculated in step S13, is greater than the discrimination value Tto (step S152). If the conclusion is YES, power-on shift is identified (step S153). If NO, power-off shift is identified (step S154). The TCU 16 stores the memories with the result of power on/off discrimination, and then returns to the main routine shown in FIG. 4.

The above method of power on/off discrimination is based on the following principle. Generally, equation (6) is obtained if the turbine shaft torque T, the turbine speed changing rate $\omega t$ for transmission control, and the clutch friction torque Tb are replaced by 0, $\omega to$, and Tto, respectively, in equation (A1) which represents the relationships of the value Tb to the values Tt and $\omega t$. When no other elements except the clutches are operating, the power on/off discrimination is effected depending on whether or not the turbine shaft torque Tt produced is great enough to ensure the target value $\omega to$. Thus, the following drawbacks of the conventional discrimination method, in which the power on/off discrimination depends simply on the polarity of the engine output, can be eliminated.

More specifically, the transmission control system using different logics for power-on and -off states is subject to the following drawbacks.

(1) If the engine output is somewhat negative in the up shift mode, the power-off state will be detected wrongly. As a result, the connection-side friction element (clutch) is left disengaged, so that the transmission control cannot be completed.

(2) If the engine output is somewhat positive in the down-shift mode, on the other hand, the power-on state will be detected wrongly. Accordingly, automatic increase of the rotating speed of the input shaft of the transmission is awaited, so that the connection-side friction element (clutch) fails to be connected. Thus, the transmission control cannot be completed.

Figure 34:
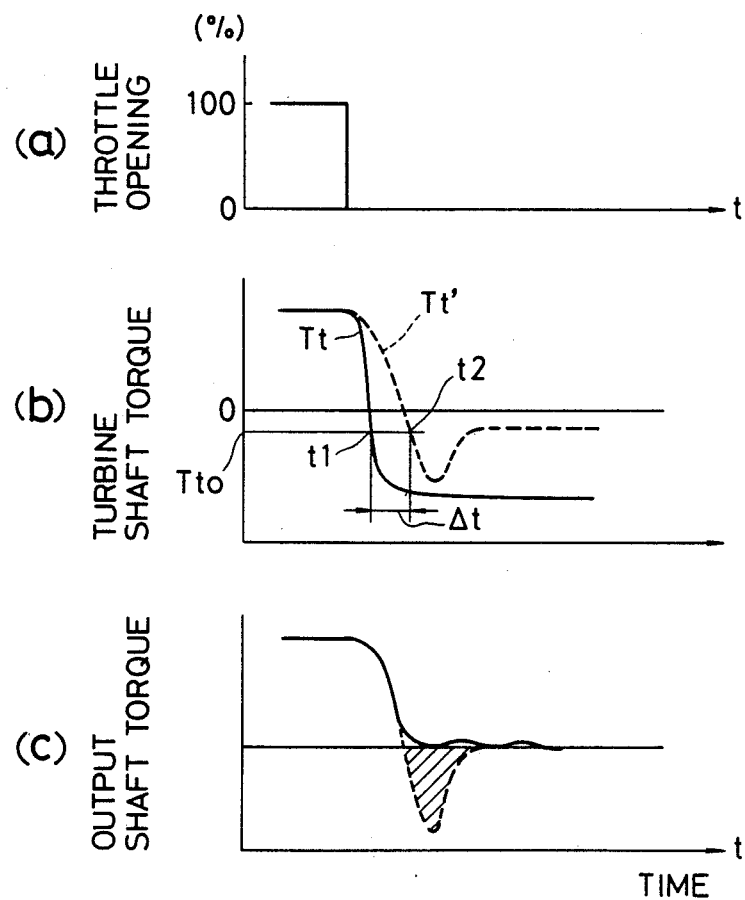
FIGS. 34(a), 34(b) and 34(c) are timing charts for illustrating time-based transitions of the throttle valve opening, turbine shaft torque, and output shaft torque used in a lift-foot up-shift mode.

A lift-foot up-shift operation or a down-shift operation with a driver's foot on an accelerator pedal requires as fast power on/off discrimination as possible. The turbine shaft torque Tt used in the aforesaid power on/off discrimination is, so to speak, an imaginary turbine shaft torque which is obtained by multiplying the net engine torque Te, obtained from equation (3), by the torque ratio t. Thus, the power on/off discrimination can be achieved more quickly than the discrimination using an actual turbine shaft torque $Tt'(=t \times CNe^2 + Tc)$ which is obtained by omitting the term $(I_E \times \omega e)$ from equation (4). Thus, during the lift-foot up- shift operation, for example, the shock of speed reduction can be avoided, in a low gear ratio mode, if the reduction of the engine output is sensed as soon as possible so that the release-side element (clutch) is disengaged without delay. Referring to FIG. 34, when the accelerator pedal is released so that the up shift mode is established (FIG. 34(a)), the actual turbine shaft torque Tt' and the imaginary turbine shaft torque Tt change along the broken and full lines of FIG. 34(b), respectively. Accordingly, the power-off state can be detected at time t1 of FIG. 34(b) when the imaginary turbine shaft torque Tt is used, and at time t2 when the actual turbine shaft torque Tt' is used. Thus, with use of the imaginary torque Tt, the power-off discrimination can be performed faster by $\Delta t$ $(=t2-t1)$ than when the actual torque Tt' is used. Correspondingly, the release-side element can be disengaged more quickly, so that the shock of speed reduction can be avoided without a drop (see hatched region of FIG. 34(c)) of the output shaft torque.

Returning to FIG. 4, the TCU 16 then determines whether the transmission control region to be established, which is determined in step S14, is different from the result obtained in the preceding duty cycle. If there is no difference, the program returns to step S11, and step S11 and the subsequent steps are repeated again. If the transmission control region is changed, on the other hand, a shift signal corresponding to the shift pattern discriminated in steps S14 and S15 is outputted (step S17), whereupon the program returns to step S11.

Hydraulic Control for Power-On Up-Shift

FIGS. 8 to 12 are flow charts showing processes of hydraulic transmission control for a power-on up-shift mode. Referring to FIGS. 13(a), 13(b) and 13(c), the processes of hydraulic control will be described in connection with the case of shift-up operation from the first gear ratio mode to the second, by way of example.

In response to a shift signal for a power-on up-shift from the first gear ratio mode to the second, the TCU 16 first calculates the respective initial duty factors $D_{U1}$ and $D_{U2}$ of the solenoid valves 47 and 48 according to the following equations (8) and (9) (step S20).

$$D_{U1} = a4 \times |Tt| + c4 \quad (8)$$

$$D_{U2} = a5 \times |Tt| + c5 \quad (9)$$

where Tt is the turbine shaft torque value calculated and stored in step S13 of FIG. 4 for each duty cycle, and a4, c4, a5, and c5 are constants applied to the case of the shift-up operation from the first gear ratio mode to the second.

Then, the TCU 16 adjusts the duty factor $D_{LR}$ of the normally-open solenoid valve 47 to the initial duty factor $D_{U1}$ set in step S20, and delivers an output signal such that the solenoid valve 47 is operated with the duty factor $D_{LR}$. Thereupon, the first-speed clutch 33, as a release-side frictional engagement element, starts to be supplied with an initial oil pressure corresponding to the initial duty factor $D_{U1}$, so that a piston (not shown) of the clutch 33 is retreated toward a position just short of the position where the clutch 33 slips (step S21; time t1 of FIG. 13(b)). If the duty factor $D_{LR}$ of the solenoid valve 47 is changed from 0% to the initial duty factor $D_{U1}$, a driving signal actually should not be delivered simply to the solenoid valve 47 with the duty factor $D_{U1}$, but be subjected to correction, as mentioned later, before it is outputted. Thus, the hydraulic responsiveness is improved. In general, if a first duty factor is changed over to a second duty factor, the correction of the solenoid valve driving signal is executed. The same driving signal correction is also required for the solenoid valve 48.

Meanwhile, the TCU 16 sets the duty factor D24 of the normally-closed solenoid valve 48 to 100%, and delivers an output signal such that the solenoid valve 48 is operated with the duty factor D24. Thereupon, a piston of the second-speed clutch 34, as a connection-side frictional engagement element, is advanced to a position just short of the position where the clutch 34 starts to engage (at time t1 of FIG. 13(c)), and an initial pressure supply period $T_{S1}$ is set in a timer (step S22). This timer may be a hard timer contained in the TCU 16, or a so-called soft timer which times the supply period $T_{S1}$ as the program is executed. The initial pressure supply period $T_{S1}$ takes a predetermined value such that the piston of the connection-side clutch 34 can be advanced to the predetermined position just short of the engagement start position if the clutch 34 is supplied with the operating oil pressure with 100-% duty factor all during the period $T_{S1}$.

The TCU 16 waits until a predetermined period $t_D$, i.e., one duty cycle (28.6 msec in this embodiment), terminates (step S23), and then adds a predetermined duty factor $\Delta D1$ to the duty factor $D_{LR}$ set in the preceding duty cycle, thus providing a new duty factor $D_{LR}$. Then, the TCU 16 delivers an output signal such that the solenoid valve 47 is operated with the duty cycle $D_{LR}$ (step S24). The added predetermined duty factor $\Delta D1$ is set to a value such that the duty factor $D_{LR}$ of the solenoid valve 47 increases at a predetermined rate (e.g., 4% per second) (see the transition of the duty factor $D_{LR}$ from time t1 to t2 in FIG. 13(b)). The TCU 16 determines whether the initial pressure supply period $T_{S1}$, set in step S22, is over (step S25). If the period $T_{S1}$ is not over, the program returns to step S23, and steps S23, S24, and S25 are repeated.

Figure 9:
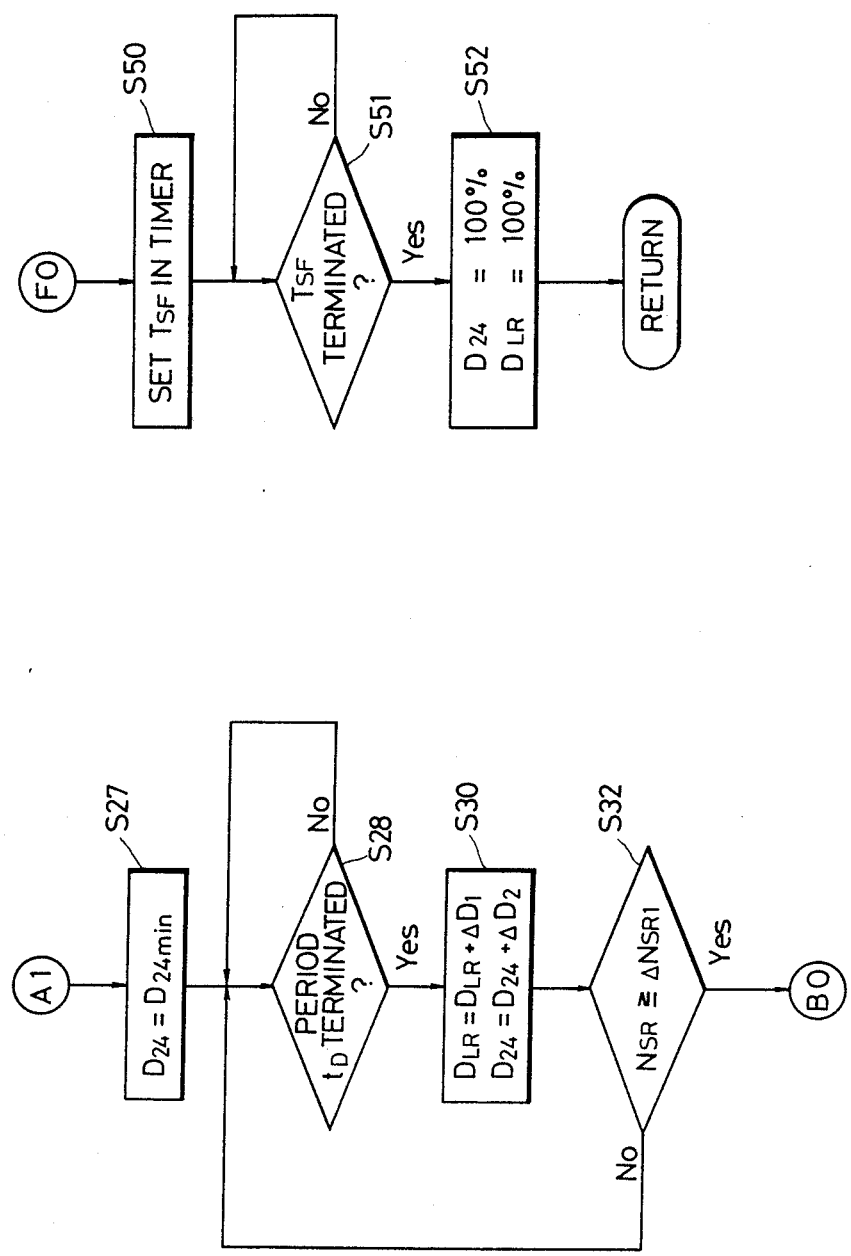
Figure 10:
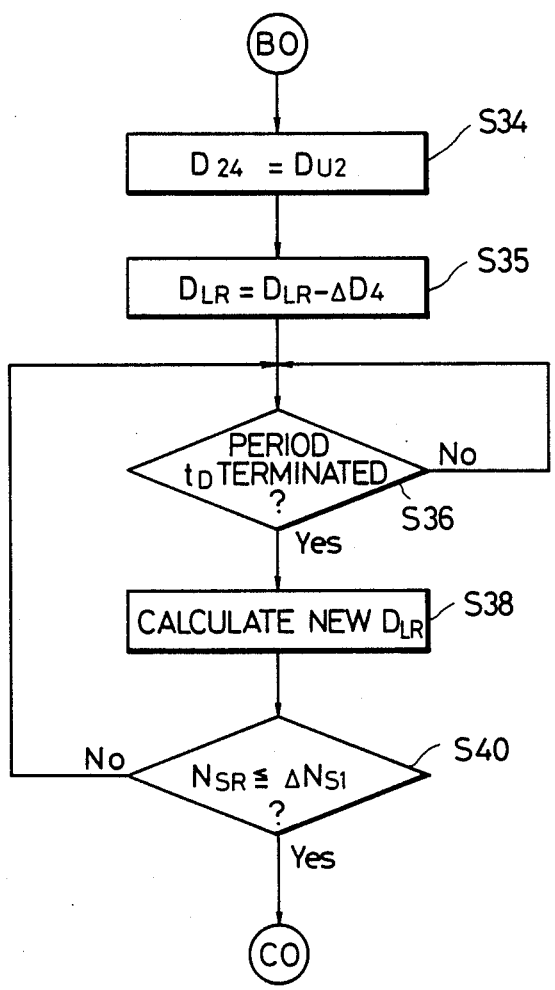

If the conclusion of step S25 is YES, that is, when the second-speed clutch 34 advances to the predetermined position just short of the engagement position after the termination of the initial pressure supply period $T_{S1}$, the program proceeds to step S27 of FIG. 9. In step S27, the TCU 16 adjusts the duty factor D24 of the solenoid value 48 to a predetermined value D24min, and then delivers a driving signal such that the valve 48 is operated with the duty factor D24 (at time t2 of FIG. 13(c)). The predetermined value D24min is a duty factor value such that the operating oil pressure supplied to the second-speed clutch 34 via the second hydraulic control valve 46 is kept at a hold pressure without increasing or decreasing. When the predetermined period $t_D$ for one duty cycle terminates (step S28), the TCU 16 adds the predetermined duty factor $\Delta D1$ to the duty factor $D_{LR}$ of the solenoid valve 47 set in the preceding duty cycle, thereby providing a new duty factor $D_{LR}$, and adds a predetermined duty factor $\Delta D2$ to the duty factor D24 of the solenoid valve 47, thereby providing a new duty cycle D24. Then, the TCU 16 delivers an output signal such that the solenoid valves 47 and 48 are operated with the new duty factors $D_{LR}$ and D24, respectively (step S30). The added predetermined duty factor $\Delta D2$ is set to a value such that the duty factor D24 of the solenoid valve 48 increases at a predetermined rate (e.g., 15% per second) (see the transition of the duty factor D24 from time t2 to t3 in FIG. 13(c)).

Subsequently, the program proceeds to step S32, whereupon the TCU 16 calculates an actual slipping frequency $N_{SR}$ according to equation (10), and compares the calculated value with a predetermined discrimination value $\Delta N_{SR1}$ (e.g., 10 rpm). There is a relation:

$$N_{SR} = Nt - Ntc1 \quad (10)$$

where Ntc1 is a calculated turbine speed for the first gear ratio mode, which is obtained by multiplying the transfer drive gear speed No, detected by means of the No sensor 17, by a predetermined number.

If the actual slipping frequency $N_{SR}$ is smaller than the predetermined discrimination value $\Delta N_{SR1}$ ($N_{SR} < \Delta N_{SR1}$), the program returns to step S28, whereupon the TCU 16 repeats the operations of steps S28 to S32. Thus, the first-speed clutch 33 on the release side is gradually disengaged, while the second-speed clutch 34 on the connection side is yet to start engagement, although it is gradually moved from the predetermined position just short of the engagement start position to the engagement side. In such a situation, the turbine speed Nt gradually increases (in the latter half of a control section A of FIG. 13(a)) as the first-clutch 33 is disengaged. Thus, in the control section A (between time t1 for shift signal output and time t3 for the detection of the actual slipping frequency $N_{SR}$ attaining the predetermined discrimination value $\Delta N_{SR1}$ or more), the first-speed clutch 33 is gradually disengaged before the friction torque of the second-speed clutch 34 is produced. By doing this, the actual slipping frequency $N_{SR}$ is increased toward a predetermined target slipping frequency $N_{SO}$ mentioned later. When it is detected that the actual slipping frequency $N_{SR}$ is not less than the predetermined discrimination value $\Delta N_{SR1}$ ($N_{SR} \geq \Delta N_{SR1}$), the program proceeds to step S34 shown in FIG. 10.

In step S34, the TCU 16 adjusts the duty factor D24 of the connection-side solenoid valve 48 to the initial duty factor $D_{U2}$ calculated in step S20, and delivers an output signal such that the solenoid valve 48 is operated with the duty factor D24. At the same time, the TCU 15 subtracts a predetermined duty factor $\Delta D4$ (e.g., 2 to 6%) from the duty factor $D_{LR}$ of the release-side solenoid valve 47 set in the preceding duty cycle, thereby providing a new duty factor $D_{LR}$. Using the duty factor $D_{LR}$ as an initial value, hydraulic control is started such that the actual slipping frequency $N_{SR}$ is feedback-controlled for the predetermined target slipping frequency $N_{SO}$ (step S35). Thus, the TCU 16 waits until one duty cycle ends in step S36, then sets the duty factor $D_{LR}$ of the release-side solenoid valve 47 for each duty cycle in the following manner, and delivers a driving signal such that the solenoid valve 47 is operated with the set duty factor $D_{LR}$ (step S38). There is a relation:

$$(D_{LR})_n = (Di)_n + K_{P1} \times e_n + K_{D1}(e_n - e_{n-1}) \quad (11)$$

where $e_n$ is the difference ($e_n = N_{SO} - N_{SR}$) between the actual slipping frequency $N_{SR}$ and the target slipping frequency $N_{SO}$ for the present duty cycle, and $e_{n-1}$ is the difference between the actual slipping frequency $N_{SR}$ and the target slipping frequency $N_{SO}$ for the preceding duty cycle. $K_{P1}$ and $K_{D1}$ are a proportional gain and a differential gain, respectively, which are set to their respective predetermined values. $(Di)_n$ is an integral term, which is calculated as follows:

$$(Di)_n = (Di)_{n-1} + K_{I1} \times e_n + D_{H1} \quad (11a)$$

where $(Di)_{n-1}$ is an integral term set in the preceding duty cycle, and $K_{I1}$ is a integral gain set to a predetermined value.

$D_{H1}$ is a correction of the turbine shaft torque set in accordance with a variation $\Delta Tt$ of the turbine shaft torque caused when the engine torque Te is changed by acceleration work during the transmission control operation. The variation $\Delta Tt$ is first calculated, and the correction $D_{H1}$ responsive to the variation $\Delta Tt$ is then calculated as follows:

$$D_{H1} = a6 \times \Delta Tt \quad (12)$$

where $\Delta Tt$, in this power-on region, is given by $$\Delta Tt = (Tt)_n - (Tt)_{n-1} \quad (13)$$

In a power-off region mentioned later, $\Delta Tt$ is $$\Delta Tt = -(Tt)_n + (Tt)_{n-1} \quad (14)$$

where $(Tt)_n$ and $(Tt)_{n-1}$ are turbine shaft torques for the present and preceding duty cycles, respectively, which are set in step S13 of FIG. 4. In equation (12), a6 is a constant previously set in accordance with the shift pattern. As seen from equations (11a) and (12), the integral term $(Di)_n$ includes the duty factor correction $D_{H1}$ which can be obtained on the basis of the variation $\Delta Tt$ of the turbine shaft torque. Accordingly, the duty factor $D_{LR}$ can be corrected without delay behind the change of the turbine shaft torque. Thus, the aforesaid integral, proportional, and differential gains for the feedback control need not be set to great values, so that stable control can be effected with satisfactory follow-up performance.

Subsequently, the TCU 16 determines whether the actual slipping frequency $N_{SR}$ is not more than a negative predetermined slipping frequency $\Delta N_{S1}$ (e.g., −3 to −7 rpm) (step S40). If the conclusion of step S40 is NO, the program returns to step S36, whereupon the TCU 16 repeatedly executes steps S36 to S40 until the actual frequency $N_{SR}$ becomes not more than the predetermined frequency $\Delta N_{S1}$. Thereupon, the duty factor $D_{LR}$ of the release-side solenoid valve 47 is feedback-controlled so that the difference between the actual slipping frequency $N_{SR}$ and the target slipping frequency $N_{SO}$ is reduced, or that the frequencies $N_{SR}$ and $N_{SO}$ are equal. On the other hand, the duty factor D24 of the connection-side solenoid valve 48 is kept constant at the level of the initial duty factor $D_{U2}$. As a result, an operating oil pressure corresponding to the initial duty factor $D_{U2}$ of the solenoid valve 48 is supplied to the second-speed clutch 34 via the second hydraulic control valve 46, so that the piston (not shown) of the clutch 34 gradually moves to the engagement side. Thus, the clutch 34 starts to engage, so that the turbine speed Nt is motivated to lower. Since the engine 10 is in the power-on state, however, the turbine speed Nt can be prevented from lowering by setting the duty factor $D_{LR}$ of the release-side solenoid valve 47 to a greater value. However, when the engagement of the engagement-side clutch 34 advances so that the engaging force of the clutch 34 exceeds the relatively great value of the duty factor $D_{LR}$ of the release-side solenoid valve 47, the turbine speed Nt starts to lower. At time t4 of FIG. 13(a), the actual slipping frequency $N_{SR}$ becomes not more than the negative predetermined slipping frequency $\Delta N_{S1}$. When this is detected (YES in step S40), the program advances to step S42 shown in FIG. 11. Thus, hydraulic control in a control section B (between times t3 and t4) shown in FIG. 13 is finished.

Figure 11:
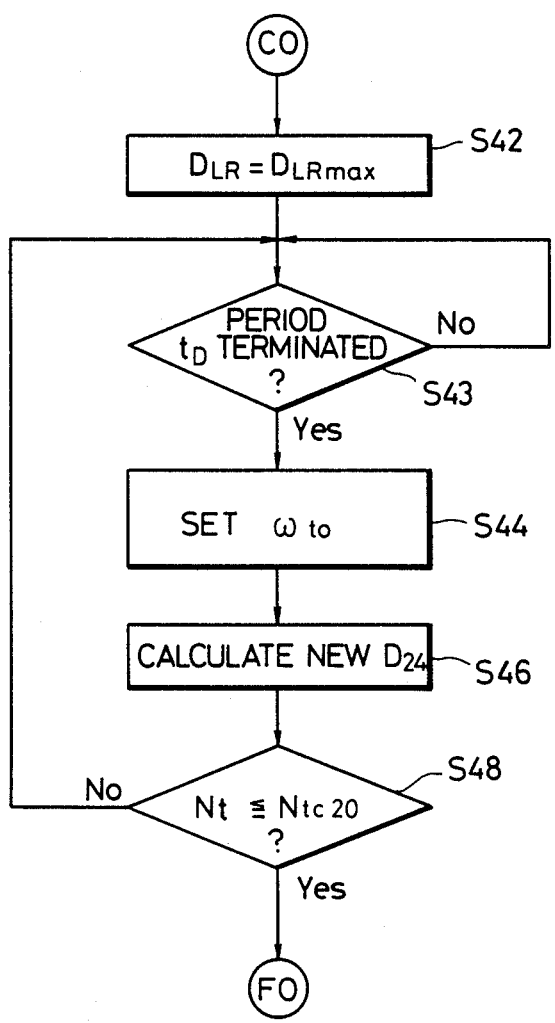

If the actual slipping frequency $N_{SR}$ is found to be not more than the negative predetermined slipping frequency $\Delta N_{S1}$ in the control section B, step S42 of FIG. 11 is executed. If it is detected twice in two consecutive duty cycles, for example, in the control section A that the actual slipping frequency $N_{SR}$ is lowered to the level of the negative predetermined slipping frequency $\Delta N_{S1}$ or less by any disturbance, the hydraulic control in the control section B may be omitted. In this case, the program proceeds directly to step S42 of FIG. 11, whereupon hydraulic control in a control section C is started.

In hydraulic control operations in the control section C and control sections D and E subsequent thereto, the duty factor D24 of the connection-side solenoid valve 48 is feedback-controlled so that the difference between the turbine speed changing rate $\omega t$ and the predetermined target turbine speed changing rate $\omega to$ is minimized. Thus, the turbine speed Nt is gradually decreased toward a calculated turbine speed Ntc2 for the second gear ratio mode. The TCU 16 first adjusts the duty factor $D_{LR}$ of the release-side solenoid valve 47 to a predetermined duty factor $D_{LR}max$, and delivers a driving signal such that the solenoid valve 47 is operated with the adjusted duty factor $D_{LR}$ (step S42). The predetermined duty factor $D_{LR}max$ is set to a value such that the operating oil pressure supplied through the first hydraulic control valve 44 to the first-speed clutch 33 can be kept at a fixed pressure (hold pressure), and that the piston of the clutch 33 can be held in a position corresponding to time t4 of FIG. 13(b). Until the transmission control is practically completed thereafter (between times t4 and t8 of FIG. 13(b)), the duty factor $D_{LR}$ of the release-side solenoid valve 47 is kept at the level of the predetermined duty factor $D_{LR}max$ which provides the hold pressure for the first-speed clutch 33.

Then, after the predetermined period $t_D$ terminates (step S43), the program advances to step S44. In step S44, the target turbine speed changing rate $\omega to$ is set as follows:

$$\omega to = a7 \times No + b7 \tag{15}$$

where a7 and b7 are set to predetermined values (negative values) corresponding to the control sections C, D and E. In the control section C immediately after the start of the feedback control, the values a7 and b7 are adjusted so that the target turbine speed changing rate $\omega to$ is set to a value such that the turbine speed Nt decreases gradually. In the control section D next to the control section C, the changing rate $\omega to$ is adjusted so that its absolute value is greater than in the section C. Thus, in the section D, the turbine speed Nt decreases more sharply. In the control section E during which the engagement of the second-speed clutch 34 finishes, the absolute value of the changing rate is reduced again to prevent the shock of the transmission control (see the time-based transition of the turbine speed Nt of FIG. 13(a)).

Then, the TCU 16 calculates and sets the duty factor D24 of the connection-side solenoid valve 48 according to the following equation (16), using the duty factor obtained, as an initial value, at time t4 when it is detected that the actual slipping frequency $N_{SR}$ is reduced to the level of the negative predetermined slipping frequency $\Delta N_{S1}$ or less. Then, the TCU 16 delivers a driving signal such that the solenoid valve 48 is operated with the set duty factor D24 (step S46). There is a relation:

$$(D24)_n = (Di)_n + K_{P2} \times E_n + K_{D2}(E_n - E_{n-1}) \tag{16}$$

where $E_n$ is the difference ($E_n = \omega to - \omega t$) between the actual turbine speed changing rate $\omega t$ and the target turbine speed changing rate $\omega to$ for the present duty cycle set in step S44. Based on actual turbine speeds $(Nt)_n$ and $(Nt)_{n-1}$ for the present and preceding duty cycles, the actual changing rate $\omega t$ is obtained as follows:

$$(\omega t)_n = (Nt)_n - (Nt)_{n-1} \tag{17}$$

$E_{n-1}$ is the difference between the actual turbine speed changing rate $\omega t$ and the target turbine speed changing rate $\omega to$ for the preceding duty cycle. $K_{P2}$ and $K_{D2}$ are a proportional gain and a differential gain, respectively, which are set to their respective predetermined values. $(Di)_n$ is an integral term, which is calculated as follows:

$$(Di)_n = (Di)_{n-1} + K_{I2} \times E_n + D_{H1} + D_{H2} \tag{18}$$

where $(Di)_{n-1}$ is an integral term set in the preceding duty cycle, and $K_{I2}$ is a integral gain set to a predetermined value.

$D_{H1}$ is a correction of the turbine shaft torque set in accordance with a variation $\Delta Tt$ of the turbine shaft torque caused when the engine torque Te is changed by acceleration work during the transmission control operation. The correction $D_{H1}$ is obtained according to the same equations as equations (12) to (14).

$D_{H2}$ is a corrected duty factor for the change of the target turbine speed changing rate, which is used only when the control section changes from C to D or from D to E. This value is obtained as follows:

$$D_{H2} = \alpha \times \Delta \omega to \tag{19}$$

$$\Delta \omega to = (\omega to)_n - (\omega to)_{n-1} \tag{20}$$

where $(\omega to)_n$ is a target turbine speed changing rate to be used for the present duty cycle and the subsequent duty cycles, and $(\omega to)_{n-1}$ is a target turbine speed changing rate having so far been used for the preceding duty cycles. In equation (19), moreover, $\alpha$ is a constant set according to the shift pattern.

Like the integral term of the duty factor $D_{LR}$ of the release-side solenoid valve 47 calculated in the control section B, the integral term $(Di)_n$ of the duty factor D24 calculated for each duty cycle is corrected on the basis of the duty factor correction $D_{H1}$, i.e., the variation $\Delta Tt$ of the turbine shaft torque. When the control section is changed, the integral term $(Di)_n$ is corrected in accordance with the variation $\Delta\omega to$ of the target turbine speed changing rate. Accordingly, the duty factor D24 can be corrected without delay behind the changes of the turbine shaft torque and the target turbine speed changing rate. Thus, the aforesaid integral, proportional, and differential gains for the feedback control need not be set to great values, so that hunting-free stable control can be effected with satisfactory follow-up performance.

After calculating the duty factor D24 and delivering the driving signal in step S46, the TCU 16 proceeds to step S48, and determines whether the turbine speed Nt has attained a predetermined speed Ntc20 which is higher than the calculated turbine speed Ntc2 for the second gear ratio mode by $\Delta Ntc2$ (e.g., 80 to 120 rpm). If the conclusion of step S46 is NO, the program returns to step S43, and the operations of steps S43 to S48 are repeated.

At the time immediately after the control section C is entered, the engagement of the connection-side clutch 34 is just started. Therefore, the shock of the transmission control at the start of the engagement can be avoided by reducing the turbine speed Nt at the aforesaid target turbine speed changing rate $\omega to$. When the turbine speed Nt is reduced to the level of the product of the transfer drive gear speed No and a predetermined coefficient (e.g., 2.8), the TCU 16 concludes that the control section C is left, that is, the control section D is entered, and changes the absolute value of the target changing rate $\omega to$ in step S44 into a greater value (at time t5 of FIG. 13(a)).

If the absolute value of the target turbine speed changing rate $\omega to$ is changed into the greater value, the duty factor D24 of the connection-side solenoid valve 48 is adjusted (during the period between times t5 and t6 of FIG. 13(c)) to a value greater than the value set in the control section C. Thus, the turbine speed Nt is quickly lowered substantially at the target changing rate $\omega to$. The greater the absolute value of the target value $\omega to$, the higher the transmission-control responsiveness will be.

Subsequently, when the turbine speed Nt is further reduced to the level of the product of the transfer drive gear speed No and another predetermined coefficient (e.g., 2.2), that is, when the piston of the second-speed clutch 34 is gradually moved close to the engagement end position, the TCU 16 concludes that the control section D is left, that is, the control section E is entered, and changes the absolute value of the target turbine speed changing rate $\omega to$ in step S44 into a value smaller than the value set in the control section D (at time t6 of FIG. 13(a)). If the absolute value of the target turbine speed changing rate $\omega to$ is changed into the smaller value, the duty factor D24 of the connection-side solenoid valve 48 is adjusted (during the period between times t6 and t7 of FIG. 13(c)) to a value smaller than the value set in the control section D. Thus, the turbine speed Nt is slowly lowered substantially at the target changing rate $\omega to$. As a result, the release-side clutch 33 is disengaged completely, so that the transmission-control shock can be avoided near the time when the engagement of the connection-side clutch 34 is completed.

If the conclusion of step S48 is YES, that is, when the turbine speed Nt attains the level of the predetermined speed Ntc20 just higher than the calculated turbine speed Ntc2 for the second gear ratio mode (at time t7 of FIG. 13(c)), the TCU 16 sets a predetermined period $T_{SF}$ (e.g., 0.5 sec) in the aforesaid timer (step S50), and waits until the period $T_{SF}$ terminates (step S51). By doing this, the TCU 16 can securely complete the engagement of the connection-side clutch 34.

When the predetermined period $T_{SF}$ terminates so that the conclusion of step S51 is YES, the TCU 16 sets both the duty factors $D_{LR}$ and D24 of the release- and connection-side solenoid valves 47 and 48 to 100%, and delivers a driving signal such that the solenoid valves 47 and 48 are operated with the duty factors $D_{LR}$ and D24 (at time t8 of FIGS. 13(b) and 13(c)). Thus, the hydraulic transmission control for the power-on up-shift from the first gear ratio mode to the second is completed.

Hydraulic Control for Power-On Down-Shift

Figure 14:
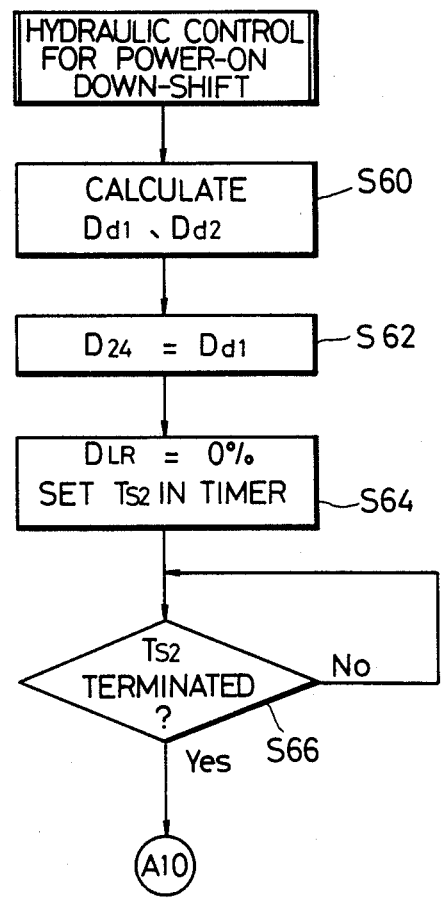
FIGS. 14, 15 and 16 are flow charts illustrating processes of hydraulic control executed in a power-on down-shift mode by means of the transmission control unit (TCU) 16.
Figure 15:
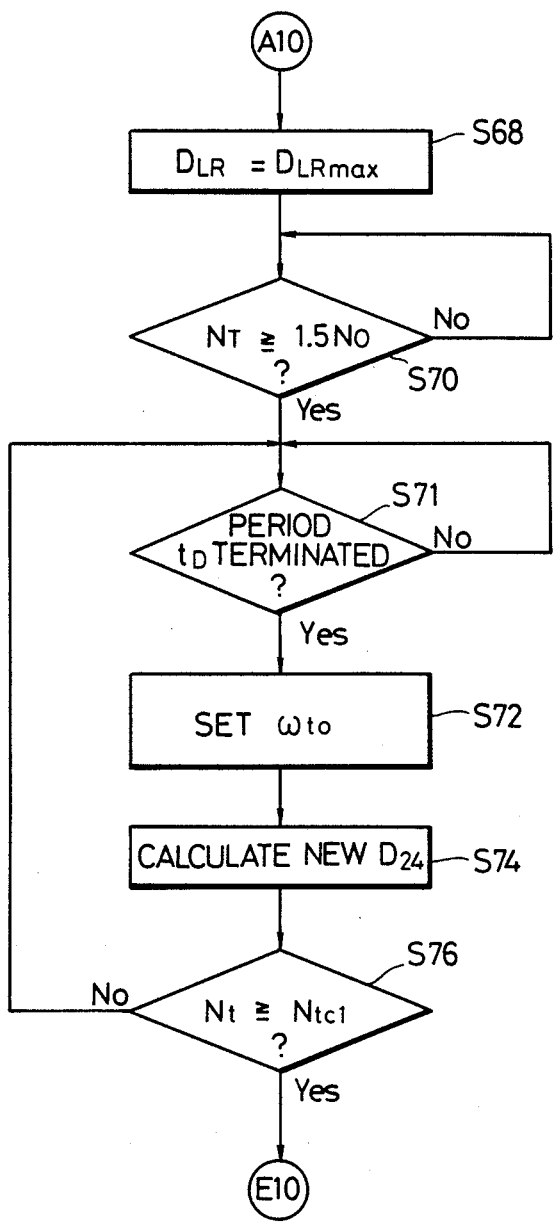
Figure 16:
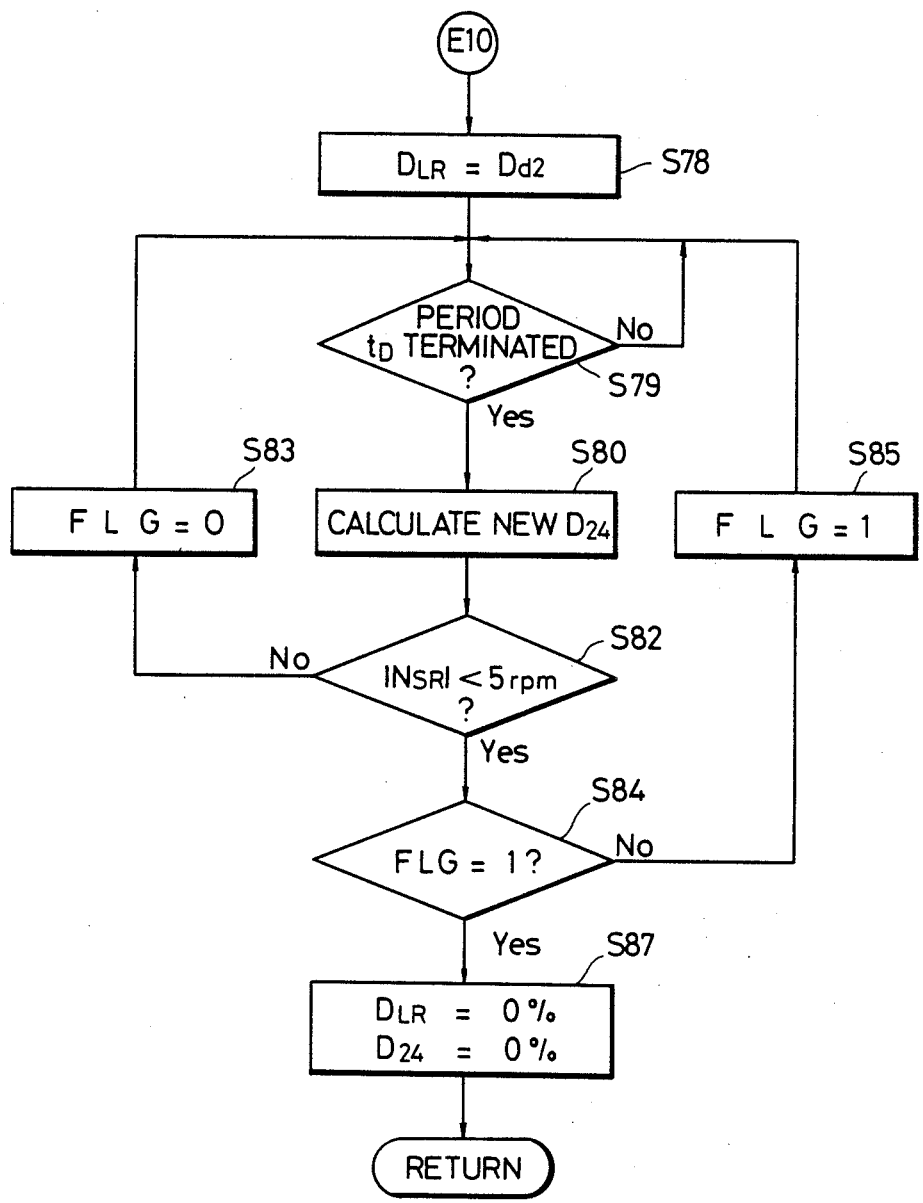
Figure 17:
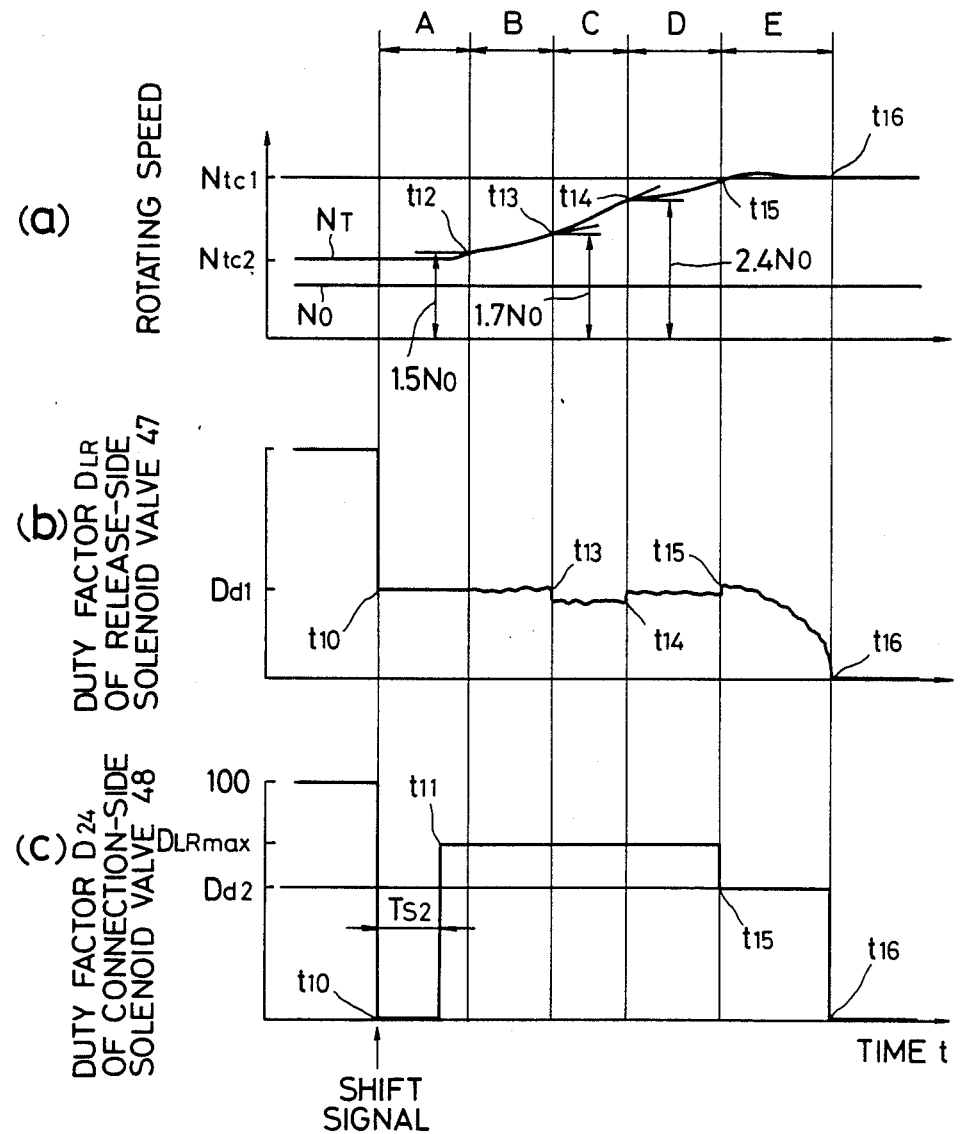
FIGS. 17(a), 17(b) and 17(c) are timing charts showing time-based transitions of the turbine speed Nt and the transfer drive gear speed No and transitions of the respective duty factors of the release- and connection-side solenoid valves, used in the power-on down-shift mode.

FIGS. 14 to 16 are flow charts showing processes of hydraulic transmission control for a power-on down-shift mode. Referring to FIG. 17, the processes of hydraulic control will be described in connection with the case of shift-down operation from the second gear ratio mode to the first, by way of example.

In response to a shift signal for a power-on down-shift from the second gear ratio mode to the first, the TCU 16 first calculates the respective initial duty factors $D_{d1}$ and $D_{d2}$ of the solenoid valves 47 and 48 according to the following equations (21) and (22) which resemble equations (8) and (9), respectively (step S60).

$$D_{d1} = a8 \times |Tt| + c8 \tag{21}$$

$$D_{d2} = a9 \times |Tt| + c9 \tag{22}$$

where a8, c8, a9, and c9 are constants applied to the case of the shift-down operation from the second gear ratio mode to the first.

Then, the TCU 16 adjusts the duty factor D24 of the release-side solenoid valve 48 to the initial duty factor $D_{d1}$ set in step S60, and delivers an output signal such that the solenoid valve 48 is operated with the duty factor D24. Thereupon, the second-speed clutch 34, for use as the release-side frictional engagement element, starts to be supplied with an initial oil pressure corresponding to the initial duty factor $D_{d1}$, so that the piston (not shown) of the clutch 34 is retreated toward a position just short of the position where the clutch 34 slips (step S62; time t10 of FIG. 17(b)). Meanwhile, the TCU 16 sets the duty factor $D_{LR}$ of the connection-side solenoid valve 47 to 0%, and delivers an output signal such that the solenoid valve 47 is operated with the duty factor $D_{LR}$. Thus, the normally-open solenoid valve 47 is fully opened. Thereupon, the piston of the first-speed clutch 33, for use as the connection-side frictional engagement element, is moved toward a position just short of the position where the clutch 33 starts to engage (at time t10 of FIG. 17(c)), and an initial pressure supply period $T_{S2}$ is set in the timer (step S64). If the normally-open solenoid valve 47 is driven to supply the connection-side clutch 33 with the operating oil pressure with 0-% duty factor all during the period $T_{S2}$, the piston of the clutch 33 can be advanced to the predetermined position just short of the engagement start position.

The TCU 16 determines whether the initial pressure supply period $T_{S2}$, set in step S64, is over (step S66). If the period $T_{S2}$ is not over yet, the TCU 16 waits until the period $T_{S2}$ terminates, repeatedly executing the operation of step S66.

If the conclusion of step S66 is YES, that is, when the first-speed clutch 33 advances to the predetermined position just short of the engagement position after the termination of the initial pressure supply period $T_{S2}$, the program proceeds to step S68 of FIG. 15. In step S68, the TCU 16 adjusts the duty factor $D_{LR}$ of the connection-side solenoid value 47 to the predetermined value $D_{LR}$max for the hold pressure, and then delivers a driving signal such that the valve 47 is operated with the duty factor $D_{LR}$ (at time t11 of FIG. 17(c)). The duty factor $D_{LR}$ of the connection-side solenoid valve 47 is kept at the level of the predetermined duty factor $D_{LR}$max for the hold pressure on the first-speed clutch 33 until the turbine speed Nt attains, thereafter, the calculated turbine speed Ntc1 for the first gear ratio mode (during the period between times t11 and t15 of FIG. 17(a)).

Meanwhile, the piston of the release-side clutch 34 gradually moves to the side for disengagement, thereby reducing the friction torque of the clutch 34, so that the turbine speed Nt starts to increase gradually. Then, the TCU 16 determines whether the turbine speed Nt is increased above a first predetermined discrimination value (e.g., 1.5×No) (step S70). If the discrimination value (1.5×No) is not exceeded, the TCU 16 waits until the predetermined speed value is exceeded, repeating the discrimination of step S70.

If the turbine speed Nt exceeds the speed (1.5×No) (at time t12 of FIG. 17(a)), then it indicates that hydraulic transmission control in a control section A of FIG. 17 is finished, and that a control section B is entered. In step S71 subsequent to step S70, the TCU 16 waits until one duty cycle terminates. Thereafter, the TCU 16 starts a hydraulic control operation such that the turbine speed Nt is increased toward the calculated turbine speed Ntc1 for the first gear ratio mode while adjusting the turbine speed changing rate ωt by feedback control. Thus, in hydraulic control operations in the control section B and control sections C and D subsequent thereto, the duty factor D24 of the release-side solenoid valve 48 is feedback-controlled so as to take a value such that the difference between the changing rate ωt and the predetermined target turbine speed changing rate ωto is minimized. Also, the turbine speed Nt is gradually increased toward the level of the calculated turbine speed Ntc1 for the first gear ratio mode.

In step S72, the TCU 16 first sets the target turbine speed changing rate ωto as follows:

$$\omega to = a10 \times No + b10 \quad (23)$$

where a10 and b10 are constants which are set to predetermined values (positive values) corresponding to the control sections B, C and D. In the control section B immediately after the start of the feedback control, the values a10 and b10 are adjusted so that the target turbine speed changing rate ωto is set to a value such that the turbine speed Nt increases gradually. In the control section C next to the control section B, the changing rate is adjusted to a greater value than in the section B. Thus, in the section C, the turbine speed Nt increases more sharply. In the control section D during which the turbine speed Nt approaches the calculated turbine speed Ntc1 for the first gear ratio mode, the changing rate is reduced again to prevent an overshoot of the turbine speed Nt (see the time-based transition of the turbine speed Nt of FIG. 17(a)).

Then, the TCU 16 calculates and sets the duty factor D24 of the release-side solenoid valve 48 according to the same equations as equations (16) and (18), using the duty factor obtained, as an initial value, at time t12 when the turbine speed Nt exceeds the speed (1.5×No). Then, the TCU 16 delivers a driving signal such that the solenoid valve 48 is operated with the set duty factor D24 (step S74). The integral, proportional, and differential gains $K_{I2}$, $K_{P2}$, and $K_{D2}$ in equations (16) and (18) are set to their respective optimum values for the shift pattern in the power-on down-shift mode.

After calculating the duty factor D24 and delivering the driving signal in step S74, the TCU 16 proceeds to step S76, and determines whether the turbine speed Nt has attained the level of the calculated turbine speed Ntc1 for the first gear ratio mode. If the conclusion of step S76 is NO, the program returns to step S71, and the operations of steps S71 to S76 are repeated.

At the time immediately after the control section B is entered, the disengagement of the release-side clutch 34 is just started. Therefore, an overshoot of the turbine speed Nt can be avoided by increasing the turbine speed Nt at the aforesaid target turbine speed changing rate ωto. When the turbine speed Nt is increased to the level of the product of the transfer drive gear speed No and a predetermined coefficient (e.g., 1.7), the TCU 16 concludes that the control section B is left, that is, the control section C is entered, and changes the target turbine speed changing rate ωto into a greater value in step S72 (at time t13 of FIG. 17(a)).

If the target turbine speed changing rate ωto is changed into the greater value, the duty factor D24 of the release-side solenoid valve 48 is adjusted (during the period between times t13 and t14 of FIG. 17(b)) to a value smaller than the value set in the control section B. Thus, the turbine speed Nt is quickly increased substantially at the target changing rate ωto. The greater the target changing rate ωto, the higher the transmission-control responsiveness will be.

Subsequently, when the turbine speed Nt is further increased to the level of the product of the transfer drive gear speed No and another predetermined coefficient (e.g., 2.4), that is, when the second-speed clutch 34 is gradually disengaged so that the turbine speed Nt approaches the calculated turbine speed Ntc1 for the first gear ratio mode, the TCU 16 concludes that the control section C is left, that is, the control section D is entered, and changes the target turbine speed changing rate ωto in step S72 into a value smaller than the value set in the control section C (at time t14 of FIG. 17(a)). If the target turbine speed changing rate ωto is changed into the smaller value, the duty factor D24 of the release-side solenoid valve 48 is adjusted (during the period between times t14 and t15 of FIG. 17(b)) to a value greater than the value set in the control section C. Thus, the turbine speed Nt is slowly increased substantially at the target changing rate ωto, and therefore, can be prevented from substantially overshooting the calculated turbine speed Ntc1 for the first gear ratio mode.

If the conclusion of step S76 is YES, and when the turbine speed Nt is found to be on the same level as the calculated turbine speed Ntc1 for the first gear ratio mode (at time t15 of FIG. 17(a)), the hydraulic control operation in the control section D is finished, and that a hydraulic control operation in a control section E is started. In the hydraulic control operation in the control section E, the duty factor D24 of the release-side solenoid valve 48 is feedback-controlled so that the difference between the actual slipping frequency $N_{SR}$ and the target slipping frequency $N_{SO}$ (e.g., 20 rpm) is minimized, and the engagement of the first-speed clutch 33 on the connection side is gradually strengthened in the meantime. Thus, in step S78, the TCU 16 adjusts the duty factor $D_{LR}$ of the connection-side solenoid valve 47 to the initial duty factor $D_{d2}$, which, set in step S60, is smaller than the duty factor $D_{LR}$max, and delivers a driving signal such that the solenoid valve 47 is operated with the duty factor $D_{LR}$ (at time t15 of FIG. 17(c)). Thereupon, the piston of the first-speed clutch 33 on the connection side starts to move gradually to the engagement side.

Subsequently, the TCU 16 waits until the predetermined period $t_D$ terminates in step S79, then calculates the duty factor D24 of the release-side solenoid valve 48 for each duty cycle, according to the following equations (24) and (24a) which resemble equations (11) and (11a), respectively, and delivers a driving signal such that the solenoid valve 48 is operated with the duty factor D24 (step S80). There are relations:

$$(D24)_n = (Di)_n + K_{P1} \times e_n + K_{D1}(e_n - e_{n-1}) \quad (24)$$

$$(Di)_n = (Di)_{n-1} + K_{I1} \times e_n + D_{H1} \quad (24a)$$

where $(Di)_{n-1}$ is an integral term set in the preceding duty cycle. Used as the initial value is a duty factor which is set immediately before time t15 when it is detected that the calculated turbine speed Ntc1 for the first gear ratio mode is exceeded by the turbine speed Nt. $K_{I1}$, $K_{P1}$, and $K_{D1}$ are integral, proportional, and differential gains, which are set to their respective optimum values for the power-on down-shift mode. In equation (24), $e_n$ is the difference ($e_n = N_{SO} - N_{SR}$) between the actual slipping frequency $N_{SR}$ and the target slipping frequency $N_{SO}$ for the present duty cycle, and $e_{n-1}$ is the difference between the actual slipping frequency $N_{SR}$ and the target slipping frequency $N_{SO}$ for the preceding duty cycle.

$D_{H1}$ is a correction of the turbine shaft torque set in accordance with a variation $\Delta Tt$ of the turbine shaft torque caused when the engine torque Te is changed by acceleration work during the transmission control operation. The value $D_{H1}$ is calculated according to equations (12) to (14).

Then, in steps S82 to S85, the TCU 16 determines whether it is detected in two consecutive duty cycles that the absolute value of the actual slipping frequency $N_{SR}$ is smaller than a predetermined value (e.g., 5 rpm). More specifically, in step S82, the TCU 16 determines whether the absolute value of the actual slipping frequency $N_{SR}$ is smaller than the predetermined value (5 rpm). If the conclusion of step S82 is NO, the TCU 16 resets a flag value FLG to 0 (step S83). Thereupon, the program returns to step S79, and the operations of steps S79 to S82 are repeated. If the friction torque of the connection-side clutch 33 is small, and as long as the reduction of the friction torque of the clutch 34, i.e., the degree of disengagement thereof, is made greater than the increase of the friction torque of the clutch 33 by the feedback control so that the torque to increase the turbine speed Nt by means of the engine 10 in the power-on state is prevailing, the turbine speed Nt can be kept at a level higher than the calculated turbine speed Ntc1 for the first gear ratio mode by the target slipping frequency $N_{SO}$. If the friction torque of the clutch 33 becomes higher, however, the turbine speed Nt gradually lowers so that the conclusion of step S82 turns to YES, whereupon the operation of step S84 is executed.

In step S84, the TCU determines whether the flag value FLG is equal to 1. If the turbine speed Nt lowers so that the conclusion of step S82 becomes YES for the first time, the conclusion of step S84 is NO. In this case, the flag value FLG is adjusted to 1 in step S85, whereupon the program returns to step S79, and the opertions of steps S79 and S80 are executed. If it is detected twice, for two consecutive duty cycles, again in step S82 that the absolute value of the actual slipping frequency $N_{SR}$ is smaller than the predetermined value (5 rpm) (at time t16 of FIG. 17(a)), the conclusion of step S84 is YES. Thus, hydraulic control in the control section E is finished, and the operation of step S87 is executed.

In step S87, the TCU 16 sets both the duty factors $D_{LR}$ and D24 of the connection- and release-side solenoid valves 47 and 48 to 0%, and delivers no driving signal to the valves 47 and 48. Thus, the disengagement of the second-speed clutch 34 and the engagement of first-speed clutch 33 are finished, whereupon the hydraulic transmission control for the power-on down-shift from the second gear ratio mode to the first is completed.

Hydraulic Control for Power-Off Up-Shift

Figure 18:
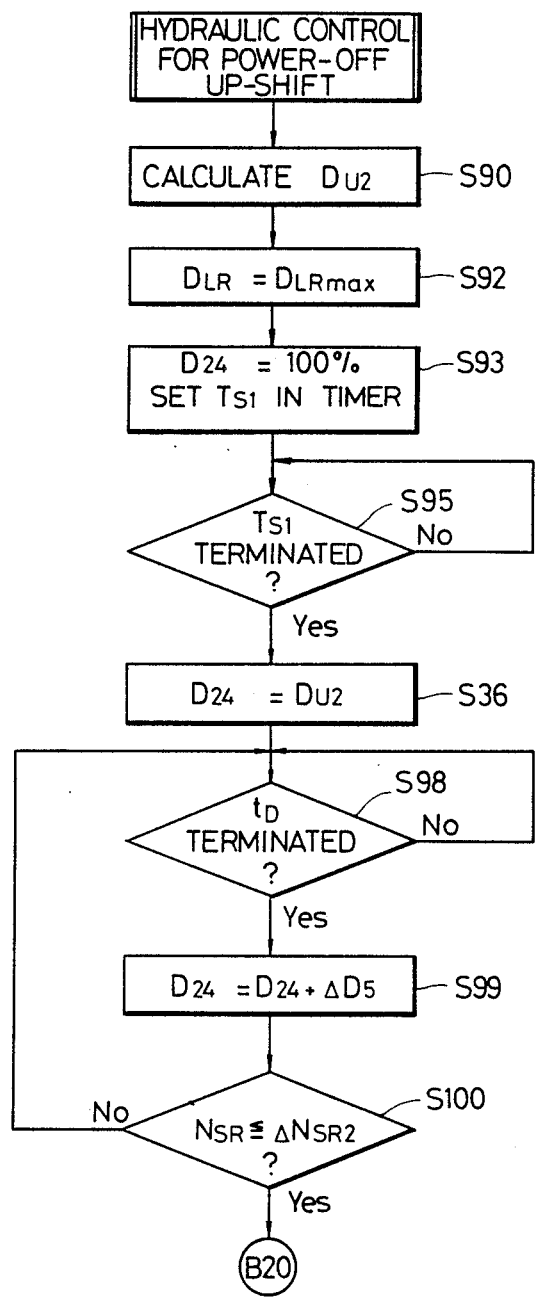
FIGS. 18, 19 and 20 are flow charts illustrating processes of hydraulic control executed in a power-off up-shift mode by means of the transmission control unit (TCU) 16.
Figure 20:
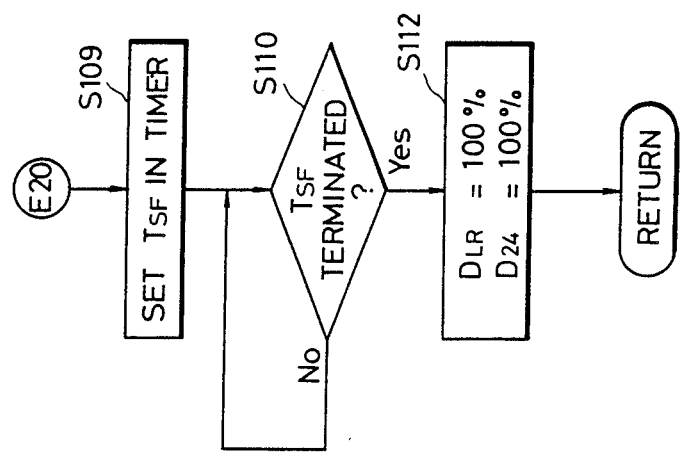
Figure 19:
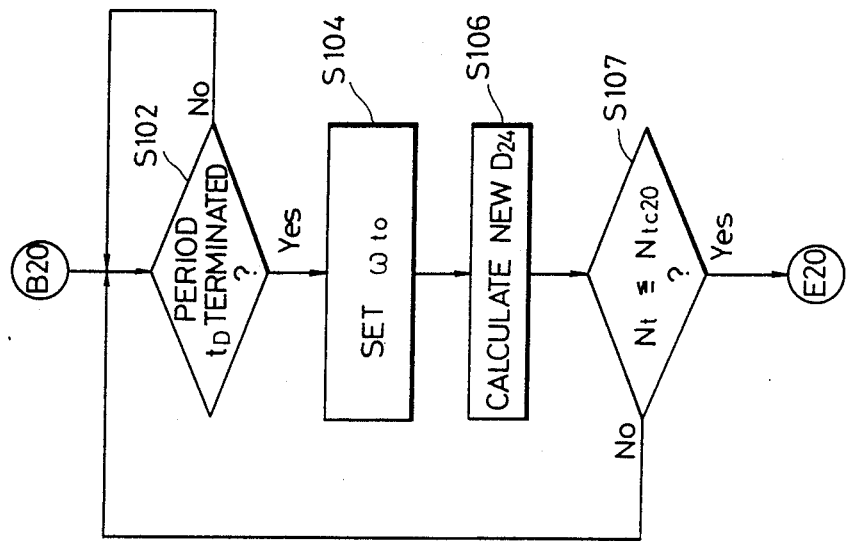

FIGS. 18 to 20 are flow charts showing processes of hydraulic transmission control for a power-off up-shift mode. Referring to FIG. 21, the processes of hydraulic control will be described in connection with the case of shift-up operation from the first gear ratio mode to the second, by way of example.

In response to a shift signal for a power-off up-shift from the first gear ratio mode to the second, the TCU 16 first calculates the initial duty factor $D_{U2}$ of the connection-side solenoid valves 48 according to the same equation as equation (9) (step S90).

Then, the TCU 16 adjusts the duty factor $D_{LR}$ of the release-side solenoid valve 47 to the predetermined duty factor $D_{LR}$max for the hold pressure, and delivers an output signal such that the solenoid valve 47 is operated with the duty factor $D_{LR}$. Thereupon, the piston (not shown) of the first-speed clutch 33, for use as the release-side frictional engagement element, is retreated toward a stand-by position where the clutch 33 slips entirely and the engagement can be resumed at once (step S92; time 21 of FIG. 21(b)). When the engine 10 is in a power-off operation mode, there is no possibility of the turbine speed Nt overshooting even if the release-side clutch 33 is disengaged immediately after the delivery of the shift signal. On the contrary, a transmission control shock may possibly be caused unless the clutch 33 is released without delay. Meanwhile, the TCU 16 sets the duty factor D24 of the connection-side solenoid valve 48 to 100%, and delivers an output signal such that the solenoid valve 48 is operated with the duty factor D24, i.e., a driving signal to fully open the solenoid valve 48. Thereupon, a piston of the second-speed clutch 34, for use as a connection-side frictional engagement element, is advanced toward a position just short of the position where the clutch 34 starts to engage (at time t21 of FIG. 21(c)), and the initial pressure supply period $T_{S1}$ is set in the timer (step S93).

The TCU 16 determines whether the initial pressure supply period $T_{S1}$, set in step S93, is over (step S95). If the period $T_{S1}$ is not over, the step S95 is repeated until the period $T_{S1}$ terminates.

If the conclusion of step S95 is YES, that is, when the second-speed clutch 34 advances to the predetermined position just short of the engagement position after the termination of the initial pressure supply period $T_{S1}$, the program proceeds to step S96. In step S96, the TCU 16 adjusts the duty factor D24 of the connection-side solenoid value 48 to the intial duty factor $D_{U2}$ calculated in step S90, and then delivers a driving signal such that the valve 48 is operated with the duty factor D24 (at time t22 of FIG. 21(c)). When the predetermined period $t_D$ for one duty cycle terminates (step S98), the TCU 16 adds a predetermined duty factor ΔD5 to the duty factor D24 of the solenoid valve 48 set in the preceding duty cycle, thereby providing a new duty factor D24, and delivers an output signal such that the solenoid valve 48 is operated with the new duty factor D24 (step S99). The added predetermined duty factor ΔD5 is set to a value such that the duty factor D24 of the solenoid valve 48 increases at a predetermined rate (e.g., 14 to 17% per second) (see the transition of the duty factor D24 from time t22 to t23 in FIG. 21(c)).

Subsequently, the program proceeds to step S100, whereupon the TCU 16 calculates the actual slipping frequency $N_{SR}$ according to equation (10), and compares the calculated value with a negative predetermined discrimination value $\Delta N_{SR2}$ (e.g., −8 to −12 rpm).

If the actual slipping frequency $N_{SR}$ is greater than the predetermined discrimination value $\Delta N_{SR2}$ ($N_{SR} > \Delta N_{SR2}$), the program returns to step S98, whereupon the TCU 16 repeats the operations of steps S98 to S100, thereby gradually increasing the duty factor D24 of the solenoid valve 48. Thus, the connection-side clutch 34 starts to engage, so that the friction torque of the clutch 34 increases gradually. Thereupon, the turbine speed Nt lowers gradually, so that the conclusion of step S100 becomes YES. Then the program proceeds to step S102 of FIG. 19, whereupon hydraulic control in a control section A is finished, and hydraulic control in a control section B is started.

In the hydraulic control operations in the control section B and control sections C and D subsequent thereto, the duty factor D24 of the connection-side solenoid valve 48 is feedback-controlled so that the difference between the turbine speed changing rate ωt and the predetermined target turbine speed changing rate ωto is minimized. Thus, the turbine speed Nt is gradually decreased toward the claculated turbine speed Ntc2 for the second gear ratio mode.

After waiting until one duty cycle or the predetermined period $t_D$ terminates in step S102, the program first sets the target turbine speed changing rate ωto to predetermined values previously stored corresponding to the control sections B to D. In the control section B immediately after the start of the feedback control, the target turbine speed changing rate ωto is set to a value such that the turbine speed Nt decreases gradually. In the control section C next to the control section B, the changing rate ωto is adjusted so that its absolute value is greater than in the section B. Thus, in the section C, the turbine speed Nt decreases more sharply. In the control section D during which the engagement of the second-speed clutch 34 substantially finishes so that the turbine speed Nt approaches the turbine speed Ntc2 for the second gear ratio mode, the absolute value of the changing rate is reduced again to prevent the shock of the transmission control (see the time-based transition of the turbine speed Nt of FIG. 21(a)).

Then, the TCU 16 calculates and sets the duty factor D24 of the connection-side solenoid valve 48 according to equations (16) and (18), using the duty factor obtained, as an initial value, at time t23 when it is detected that the actual slipping frequency $N_{SR}$ is reduced to the level of the negative predetermined slipping frequency $\Delta N_{S2}$ (e.g., −8 to −12 rpm) or less. Then, the TCU 16 delivers a driving signal such that the solenoid valve 48 is operated with the set duty factor D24 (step S106). The integral, proportional, and differential gains $K_{I2}$, $K_{P2}$, and $K_{D2}$ in equations (16) and (18) are set to their respective optimum values for the shift pattern in the power-off up-shift mode.

After calculating the duty factor D24 and delivering the driving signal in step S106, the TCU 16 proceeds to step S107, and determines whether the turbine speed Nt is lowered to the predetermined speed Ntc20 which is higher than the claculated turbine speed Ntc2 for the second gear ratio mode by ΔNtc2 (e.g., 80 to 120 rpm). If the conclusion of step S107 is NO, the program returns to step S102, and the opertions of steps S102 to S107 are repeated.

At the time immediately after the control section B is entered, the engagement of the connection-side clutch 34 is just started. Therefore, the shock of the transmission control at the start of the engagement can be avoided by reducing the turbine speed Nt at the aforesaid target turbine speed changing rate ωto. When the turbine speed Nt is reduced to the level of the product of the transfer drive gear speed No and a predetermined coefficient (e.g., 2.8), the TCU 16 concludes that the control section B is left, that is, the control section C is entered, and changes the absolute value of the target changing rate ωto in step S104 into a value greater than the value used in the control section C (at time t24 of FIG. 21(a)).

If the absolute value of the target turbine speed changing rate ωto is changed into the greater value, the duty factor D24 of the connection-side solenoid valve 48 is adjusted (during the period between times t24 and t25 of FIG. 21(c)) to a value greater than the value set in the control section B. Thus, the turbine speed Nt is quickly lowered substantially at the target changing rate ωto set in this manner. The greater the absolute value of the target value ωto, the higher the transmission-control responsiveness will be.

Subsequently, when the turbine speed Nt is further reduced to the level of the product of the transfer drive gear speed No and another predetermined coefficient (e.g., 2.2), that is, when the piston of the second-speed clutch 34 is gradually moved close to the engagement end position, the TCU 16 concludes that the control section C is left, that is, the control section D is entered, and changes the absolute value of the target turbine speed changing rate ωto in step S104 into a value smaller than the value set in the control section C (at time t25 of FIG. 21(a)). If the absolute value of the target turbine speed changing rate ωto is changed into the smaller value, the duty factor D24 of the connection-side solenoid valve 48 is adjusted (during the period between times t25 and t26 of FIG. 21(c)) to a value smaller than the value set in the control section C. Thus, the turbine speed Nt is slowly lowered substantially at the target changing rate ωto. As a result, the turbine speed Nt is changed so smoothly into the calculated turbine speed Ntc2 for the second gear ratio mode that the transmission-control shock can be avoided near the time when the engagement of the connection-side clutch 34 is completed.

If the conclusion of step S107 is YES, that is, when the turbine speed Nt attains the level of the predetermined speed Ntc20 just higher than the calculated turbine speed Ntc2 for the second gear ratio mode (at time t26 of FIG. 21(c)), the TCU 16 sets a predetermined period $T_{SF}$ (e.g., 0.5 sec) in the aforesaid timer (step S109), and waits until the period $T_{SF}$ terminates (step S110). By doing this, the TCU 16 can securely complete the engagement of the connection-side clutch 34.

When the predetermined period $T_{SF}$ terminates so that the conclusion of step S110 is YES, the program proceeds to step S112, and the TCU 16 sets both the duty factors $D_{LR}$ and $D24$ of the release- and connection-side solenoid valves 47 and 48 to 100%, and delivers a driving signal such that the solenoid valves 47 and 48 are operated with the duty factors $D_{LR}$ and $D24$ (at time t27 of FIGS. 21(b) and 21(c)). Thus, the hydraulic transmission control for the power-off up-shift from the first gear ratio mode to the second is completed.

Hydraulic Control for Power-Off Down-Shift

Figure 22:
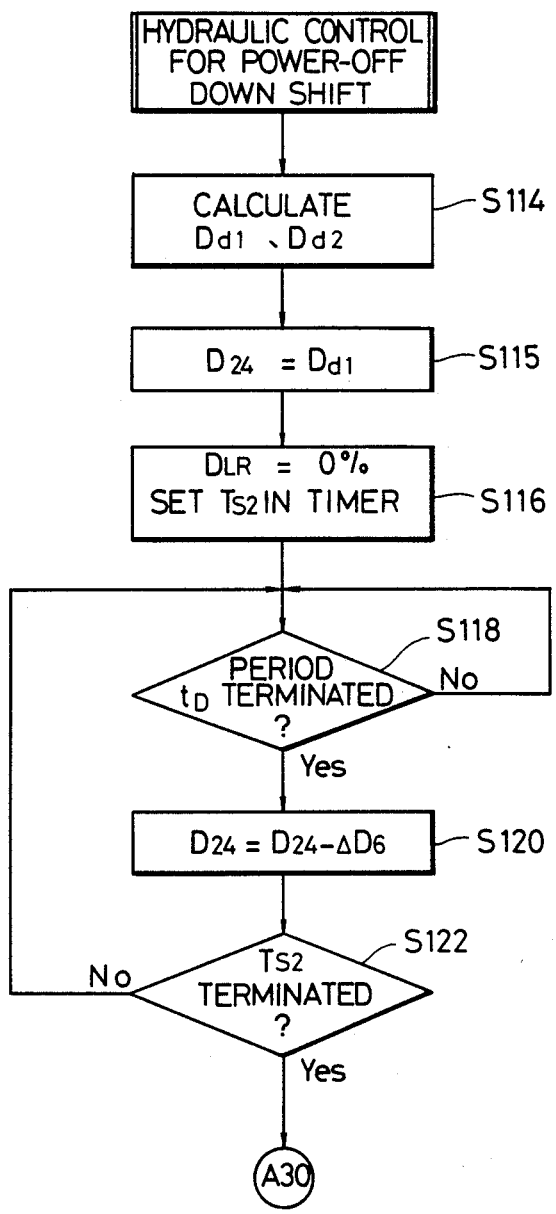
FIGS. 22, 23 and 24 are flow charts illustrating processes of hydraulic control executed in a power-off down-shift mode by means of the transmission control unit (TCU) 16.
Figure 23:
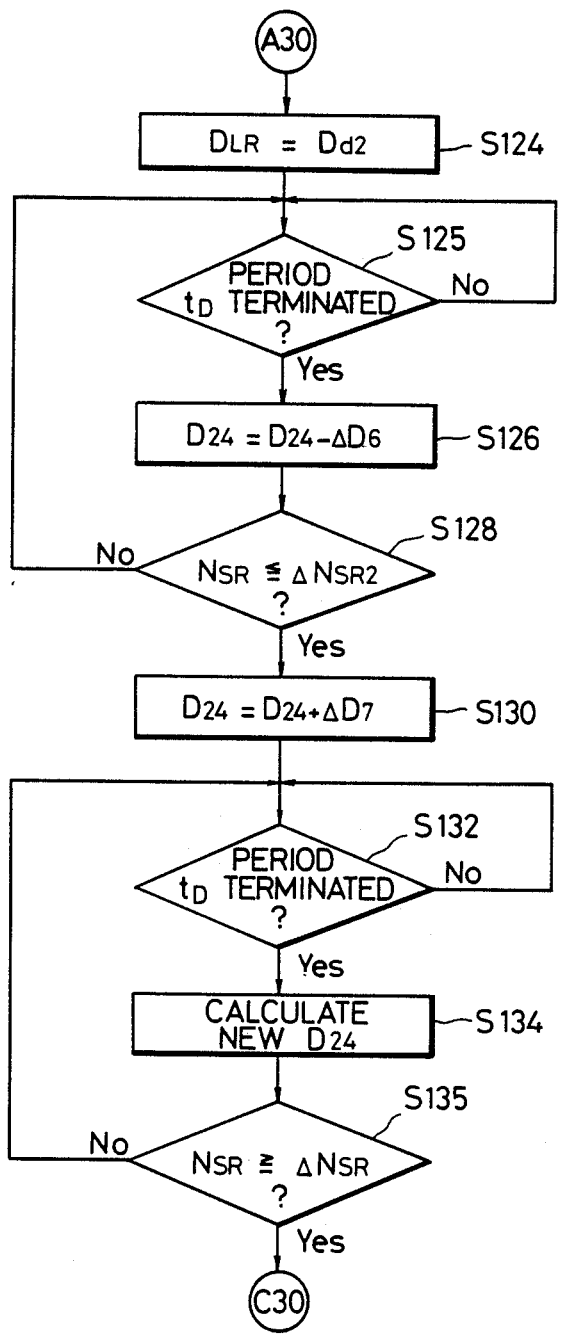
Figure 24:
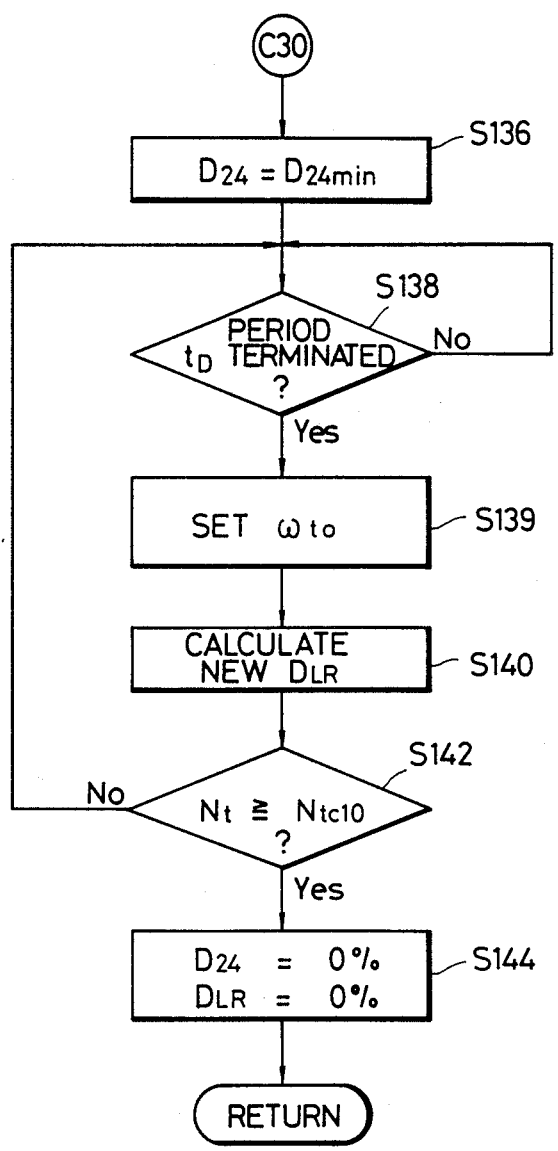
Figure 25:
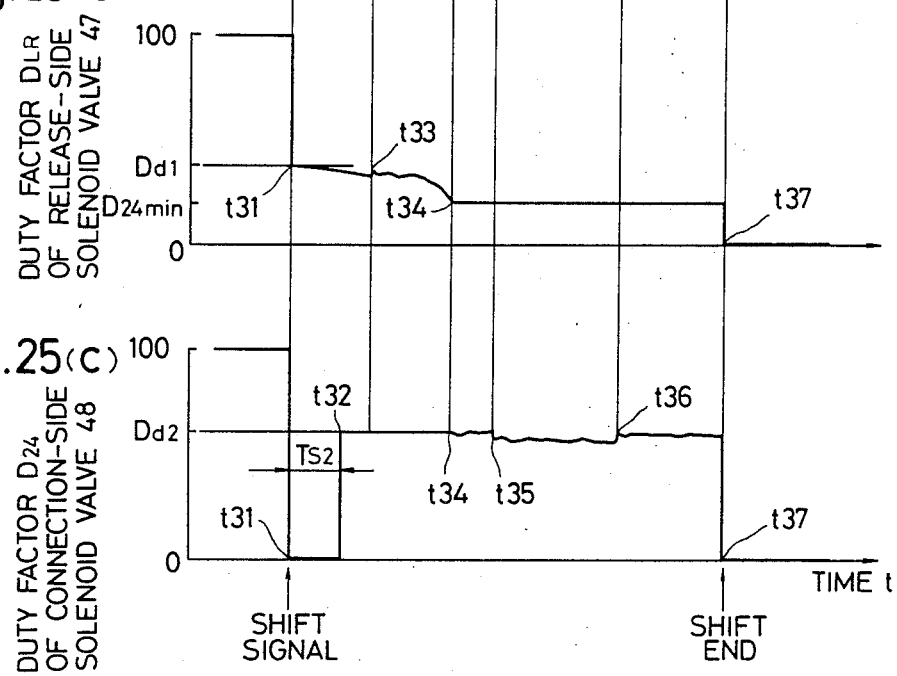
FIGS. 25(a), 25(b) and 25(c) are timing charts showing time-based transitions of the turbine speed Nt and the transfer drive gear speed No and transitions of the respective duty factors of the release- and connection-side solenoid valves, used in the power-off down-shift mode.

FIGS. 22 to 24 are flow charts showing processes of hydraulic transmission control for a power-off down-shift mode. Referring to FIG. 25, the processes of hydraulic control will be described in conenction with the case of shift-down operation from the second gear ratio mode to the first, by way of example.

In response to a shift signal for a power-off down-shift from the second gear ratio mode to the first, the TCU 16 first calculates the respective initial duty factors $D_{d1}$ and $D_{d2}$ of the solenoid valves 47 and 48 according to equations (21) and (22) (step S114). The values a8, c8, a9, and c9 in equations (21) and (22) are set to their respective optimum values for the power-off down-shift from the second speed to the first.

Then, the TCU 16 adjusts the duty factor $D24$ of the release-side solenoid valve 48 to the initial duty factor $D_{d1}$ set in step S114, and delivers an output signal such that the solenoid valve 48 is operated with the duty factor $D24$. Thereupon, the piston (not shown) of the second-speed clutch 34, for use as the release-side frictional engagement element, is retreated toward the position just short of the position where the clutch 34 slips (step S115; time t31 of FIG. 25(b)). Meanwhile, the TCU 16 sets the duty factor $D_{LR}$ of the connection-side solenoid valve 47 to 0%, and delivers an output signal such that the solenoid valve 47 is operated with the duty factor $D_{LR}$. Thereupon, the piston of the first-speed clutch 33, for use as the connection-side frictional engagement element, is moved toward a position just short of the position where the clutch 33 starts to engage (at time t31 of FIG. 25(c)), and the initial pressure supply period $T_{S2}$ is set in the timer (step S116).

The TCU 16 waits until the predetermined period $t_D$, i.e., one duty cycle (28.6 msec), terminates (step S118), and then subtracts a predetermined duty factor $\Delta D6$ from the duty factor $D24$ set in the preceding duty cycle, thus providing a new duty factor $D24$. Then, the TCU 16 delivers an output signal such that the solenoid valve 48 is operated with the duty cycle $D24$ (step S120). The subtracted predetermined duty factor $\Delta D6$ is set to a value such that the duty factor $D24$ of the solenoid value 48 decreases at a predetermined rate (e.g., 8 to 12% per second) (see the transition of the duty factor $D24$ from time t31 to t33 in FIG. 25(b)). The TCU 16 determines whether the initial pressure supply period $T_{S2}$, set in Step S116, is over (step S122). If the period $T_{S2}$ is not over, the program returns to step S118, and steps S118 to S122 are repeated. As a result, the duty factor $D24$ of the solenoid valve 48 is gradually reduced so that the release-side clutch 34 gradually moves toward the engagement start position.

If the conclusion of step S122 is YES, that is, when the first-speed clutch 33 advances to the predetermined position just short of the engagement start position after the termination of the initial pressure supply period $T_{S2}$, the program proceeds to step S124 of FIG. 23. In step S124, the TCU 16 adjusts the duty factor $D_{LR}$ of the solenoid value 47 to the initial duty factor $D_{d2}$ calculated in step S114, and then delivers a driving signal such that the valve 47 is operated with the duty factor $D_{LR}$ (at time t32 of FIG. 25(c)). Thereupon, the piston of the connection-side clutch 33 continues to move gradually toward the engagement start position. The duty factor $D_{LR}$ of the solenoid valve 47 is kept at the level of the initial duty factor $D_{d2}$ until a control section C (mentioned later) is entered (at time t34 of FIG. 25(c)).

Subsequently, when the predetermined period $t_D$ for one duty cycle terminates (step S125), the TCU 16 continues (step S126) the calculation of the new duty factor $D24$ and delivery of the output signal for the valve operation therewith in the same manner as in step S120. Then, the program proceeds to step S128, whereupon the TCU 16 calculates an actual slipping frequency $N_{SR}$ according to equation (25), and compares the calculated value with a negative predetermined discrimination value $\Delta N_{SR2}$ (e.g., $-8$ to $-12$ rpm). There is a relation:

$$N_{SR} = Nt - Ntc2, \qquad (25)$$

where Ntc2 is a calculated turbine speed for the second gear ratio mode, which is obtained by multiplying the transfer drive gear speed No by a predetermined number.

If the actual slipping frequency $N_{SR}$ is greater than the negative predetermined discrimination value $\Delta N_{SR2}$ ($N_{SR} > \Delta N_{SR2}$), the program returns to step S125, whereupon the TCU 16 repeats the operations of steps S125 to S128. Thus, the second-speed clutch 34 on the release side is gradually disengaged. If the first-speed clutch 33 on the connection side, at this time, is yet to start engagement, the turbine speed Nt gradually decreases in the latter half of a control section A of FIG. 25(a) (between time t31 for shift signal output and time t33 for the detection of the actual slipping frequency $N_{SR}$ attaining the predetermined discrimination value $\Delta N_{SR2}$ or less). When it is detected that the actual slipping frequency $N_{SR}$ is not more than the predetermined discrimination value $\Delta N_{SR2}$ ($N_{SR} \leq \Delta N_{SR2}$), the program proceeds to step S130.

In step S130, the TCU 16 adds a predetermined duty factor $\Delta D7$ (e.g., 2 to 6%) to the duty factor $D24$ of the release-side solenoid valve 48 set in the preceding duty cycle, thereby providing a new duty factor $D24$. Using this duty factor $D24$ as an initial value, the TCU 16 starts feedback control such that the difference $e_n$ ($=N_{S1}-N_{SR}$) between the actual slipping frequency $N_{SR}$ and a predetermined target slipping frequency $N_{S1}$ (e.g., $-20$ rpm) is minimized. When the connection-side clutch 33 is yet to start engagement, the turbine speed Nt tends to lower, due to reduction of the friction torque, if the duty factor $D24$ of the release-side clutch 34 is set to a smaller value. If the duty factor D24 is set to a greater value, on the other hand, the friction torque increases, so that the turbine speed Nt tends to increase. Thus, the turbine speed Nt can be kept at a predetermined value through the feedback control of the duty factor D24.

Thereupon, the TCU 16 waits until one duty cycle ends in step S132, and then sets the duty factor D24 of the release-side solenoid valve 48 for each duty cycle according to equations (24) and (24a) (step S134). The integral, proportional, and differential gains $K_{I1}$, $K_{P1}$, and $K_{D1}$ is equations (24) and (24a) are set to their respective optimum values for the power-off down-shift mode.

Subsequently, the TCU 16 determines whether the actual slipping frequency $N_{SR}$ is not less than a predetermined slipping frequency $\Delta N_{S2}$ (e.g., 3 to 8 rpm) (step S135). If the conclusion of step S135 is NO, the program returns to step S132, whereupon the TCU 16 repeatedly executes steps S132 to S135 until the actual frequency $N_{SR}$ becomes not less than the predetermined frequency $\Delta N_{S2}$. Thereupon, the duty factor D24 of the release-side solenoid valve 48 is feedback-controlled so that the difference between the actual slipping frequency $N_{SR}$ and the target slipping frequency $N_{S1}$ is reduced, or that the frequencies $N_{SR}$ and $N_{S1}$ are equal. On the other hand, the duty factor $D_{LR}$ of the connection-side solenoid valve 47 is kept constant at the level of the initial duty factor $D_{d2}$. As a result, an operating oil pressure corresponding to the initial duty factor $D_{d2}$ of the solenoid valve 47 is supplied to the first-speed clutch 33 via the first hydraulic control valve 44, so that the clutch 33 starts to engage, and the piston (not shown) of the clutch 33 gradually moves to its engagement end position. As the piston of the clutch 33 moves in this manner, the turbine speed Nt starts to increase. The duty factor D24 of the solenoid valve 48 is set to a smaller value such that the increase of the turbine speed Nt is canceled, so that the value of the duty factor D24 diminishes gradually. Although the duty factor D24 of the release-side solenoid valve 48 is set to the smaller value, the turbine speed Nt increases due to an increase of the engaging force of the engagement-side clutch 33. At time t34 of FIG. 25(a), therefore, the actual slipping frequency $N_{SR}$ becomes not less than the predetermined slipping frequency $\Delta N_{S2}$. When the TCU 16 detects this (YES in step S135), the program advances to step S136 shown in FIG. 24. Thus, hydraulic control in a control section B (between times t33 and t34) shown in FIG. 25 is finished.

If the actual slipping frequency $N_{SR}$ is found to be not less than the predetermined slipping frequency $\Delta N_{S2}$ in the control section B, step S136 of FIG. 24 is executed. If it is detected twice in two consecutive duty cycles, for example, in the control section A that the actual slipping frequency $N_{SR}$ is increased to the level of the predetermined slipping frequency $\Delta N_{S2}$ or more by any disturbance, the hydraulic control in the control section B may be omitted. In this case, the program proceeds directly to step S136 of FIG. 24, whereupon hydraulic control in the control section C is started.

In hydraulic control operations in the control section C and control sections D and E subsequent thereto, the duty factor $D_{LR}$ of the connection-side solenoid valve 47 is feedback-controlled so that the difference between the turbine speed changing rate $\omega t$ and the predetermined target turbine speed changing rate $\omega to$ is minimized. Thus, the turbine speed Nt is gradually increased toward a calculated turbine speed Ntc1 for the first gear ratio mode.

In step S136, the TCU 16 first adjusts the duty factor D24 of the release-side solenoid valve 48 to a predetermined duty factor D24min for the aforesaid hold pressure so that the hold pressure is supplied to the second-speed clutch 34. After waiting until the predetermined period $t_D$ terminates (step S138), the TCU 16 reads out a predetermined value previously stored in the memories, corresponding to each of the control sections C, D and E, and sets the read value as the target turbine speed changing rate $\omega to$ (step S139). In the control section C immediately after the start of the feedback control, the target turbine speed changing rate $\omega to$ to be read in this manner is set to a small value such that the turbine speed Nt decreases gradually. In the control section D next to the control section C, the changing rate $\omega to$ is set to a greater value than in the section C. Thus, in the section D, the turbine speed Nt decreases more sharply. In the control section E during which the engagement of the first-speed clutch 33 finishes, the changing rate is reduced again to prevent the shock of the transmission control (see the time-based transition of the turbine speed Nt of FIG. 25(a)).

Then, the TCU 16 calculates and sets the duty factor $D_{LR}$ of the connection-side solenoid valve 47 according to the following equations (26) and (26a) similar to equations (16) and (18), respectively, using the initial duty factor $D_{d2}$ obtained, as an initial value, at time t34 when it is detected that the actual slipping frequency $N_{SR}$ is increased to the level of the predetermined slipping frequency $\Delta N_{S2}$ or more. Then, the TCU 16 delivers a driving signal such that the solenoid valve 47 is operated with the set duty factor $D_{LR}$ (step S140). There are relations:

$$(D_{LR})_n = (Di)_n + K_{P1} \times E_n + K_{D1}(E_n - E_{n-1}) \quad (26)$$

$$(Di)_n = (Di)_{n-1} + K_{I1} \times E_n + D_{H1} + D_{H2} \quad (26a)$$

where $(Di)_{n-1}$ is an integral term set in the preceding duty cycle, $K_{I1}$, $K_{P1}$, and $K_{D1}$ are integral, proportional, and differential gains, which are set to their respective optimum values for the power-off down-shift mode. In equations (26) and (26a), moreover, $E_n$ is the difference between ($E_n = \omega to - \omega t$) between the actual turbine speed changing rate $\omega t$ and the target turbine speed changing rate $\omega to$ for the present duty cycle set in step S139, and $E_{(n-1)}$ is the difference between the actual turbine speed changing rate $\omega t$ and the target turbine speed changing rate $\omega to$ for the preceding duty cycle.

$D_{H1}$ is a correction of the turbine shaft torque set in accordance with a variation $\Delta Tt$ of the turbine shaft torque caused when the engine torque Te is changed by acceleration work during the transmission control operation. The correction $D_{H1}$ is calculated according to equations (12) to (14).

$D_{H2}$ is a corrected duty factor for the change of the target turbine speed changing rate, which is used only when the control section changes from C to D or from D to E. This value is obtained from equations (19) and (20). In equation (19), the coefficient $\alpha$ is set to an optimum value for the transmission control pattern of the power-off down-shift mode.

After calculating the duty factor $D_{LR}$ and delivering the driving signal in step S140, the TCU 16 proceeds to step S142, and determines whether the turbine speed Nt has attained a predetermined speed Ntc10 which is lower than the calculated turbine speed Ntc1 for the first gear ratio mode by a predetermined value (e.g., 80 to 120 rpm). If the conclusion of step S142 is NO, the program returns to step S138, and the operations of steps S138 to S142 are repeated.

At the time immediately after the control section C is entered, the engagement of the connection-side clutch 33 is just started. Therefore, the shock of the transmission control at the start of the engagement can be avoided by increasing the turbine speed Nt at the aforesaid target turbine speed changing rate ωto. When the turbine speed Nt is increased to the level of the product of the transfer drive gear speed No and a predetermined coefficient (e.g., 1.7), the TCU 16 concludes that the control section C is left, that is, the control section D is entered, and changes the target changing rate ωto in step S139 into a greater value (at time t35 of FIG. 25(a)).

If the target turbine speed changing rate ωto is changed into the greater value, the duty factor $D_{LR}$ of the connection-side solenoid valve 47 is adjusted (during the period between times t35 and t36 of FIG. 25(c)) to a value smaller than the value set in the control section C. Thus, the turbine speed Nt is quickly increased substantially at the target changing rate ωto. The greater the target value ωto, the higher the transmission-control responsiveness will be.

Subsequently, when the turbine speed Nt is further increased to the level of the product of the transfer drive gear speed No and another predetemined coefficient (e.g., 2.4), that is, when the piston of the first-speed clutch 33 is gradually moved close to the engagement end position so that the turbine speed Nt approaches the calculated turbine speed Ntc1 for the first gear ratio mode, the TCU 16 concludes that the control section D is left, that is, the control section E is entered, and changes the target turbine speed changing rate ωto in step S139 into a value smaller than the value set in the control section D (at time t36 of FIG. 25(a)). If the target turbine speed changing rate ωto is changed into the smaller value, the duty factor $D_{LR}$ of the connection-side solenoid valve 47 is adjusted (during the period between times t36 and t37 of FIG. 25(c)) to a value greater than the value set in the control section D. Thus, the turbine speed Nt is slowly increased substantially at the target changing rate ωto. As a result, the transmission-control shock can be avoided near the time when the engagement of the connection-side clutch 33 is completed.

If the conclusion of step S142 is YES, that is, when the turbine speed Nt attains the level of the predetermined speed Ntc10 just lower than the calculated turbine speed Ntc1 for the first gear ratio mode by the predetermined value (80 to 120 rpm) (at time t37 of FIG. 25(c)), the TCU 16 immediately sets both the duty factors D24 and $D_{LR}$ of the release- and connection-side solenoid valves 48 and 47 to 0%, and delivers a driving signal such that the solenoid valves 48 and 47 are operated with the duty factors D24 and $D_{LR}$, respectively (at time t37 of FIGS. 25(b) and 25(c)). Thus, the hydraulic transmission control for the power-off down-shift from the second gear ratio mode to the first is completed.

Solenoid Valve Driving Signal Correction Control

Referring now to FIGS. 26 to 29, there will be described the solenoid valve driving signal correction to improve the hydraulic responsiveness when the duty factors of the solenoid valves 47 and 48 are changed.

Figure 26:
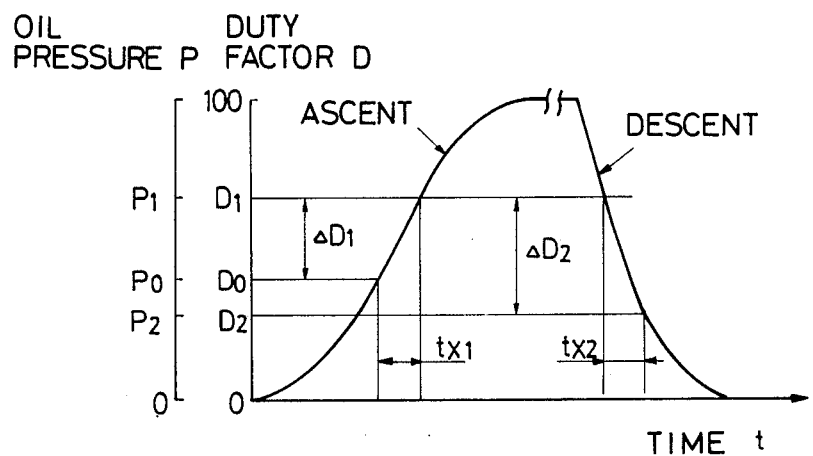
FIG. 26 is a graph showing the duty factor/correction time characteristic of a normally-closed solenoid valve.

Referring first to FIG. 26, there will be described the relationships between the operating oil pressure P supplied to the hydraulic clutch and the duty factor D of the solenoid valve and between the pressure P and the minimum necessary period (correction time) $t_x$ for the increase or drop of the pressure P, in an arrangement such that the level of the operating oil pressure is controlled by changing the duty factor of the solenoid valve, i.e., the ratio of the on-time of the solenoid valve to the duty cycle time, as in the embodiment described above. FIG. 26 shows the duty factor/correction time characteristic of the normally-closed solenoid valve. Let it be supposed that the hydraulic clutch can be supplied with operating oil pressures P0, P1, and P2 only if the duty factor of the solenoid valve is kept at values D0, D1, and D2, respectively. In changing the operating oil pressure for the clutch from P0 to P1 higher than P0, and from P1 to P2 lower than P1, the minimum necessary period for the pressure change is adjusted to $t_{x1}$ and $t_{x2}$, respectively. The periods $t_{x1}$ and $t_{x2}$ are periods of time required for the operating oil pressure to change from P0 to P1 and from P1 to P2 when the duty factor of the solenoid valve is set to 100% and 0%, respectively. Thus, the operating oil pressure P can be changed in the shortest time if the duty factor of the valve is set to 100 or 0%. When the duty factor of the solenoid valve is changed, therefore, the hydraulic control can be performed speedily by adjusting the duty factor to 100 or 0% all during the aforesaid minimum period (hereinafter referred to as correction time) $t_{x1}$ or $t_{x2}$, and then operating the solenoid valve with the adjusted duty factor.

According to the duty factor/correction time characteristic curve for the normally-open solenoid valve, which is similar to the curve shown in FIG. 26, the duty factors corresponding to the zero and maximum oil pressures are 100% and 0%, respectively. Except for the contrary relationships between the operating oil pressure and the duty factor, the characteristic curve for the normally-closed solenoid valve resembles the one shown in FIG. 26.

In increasing the duty factor of the solenoid valve from D0 to D1 (in the case of operating oil pressure increase), for example, the TCU 16 corrects the solenoid valve driving signal in the following manner.

First, if the value D1 is obtained as a result of the calculation of the duty factor of the solenoid valve, and when a command (D1-command) for the change of the duty factor from D0 to D1 is delivered (at time t50 of FIG. 27), the TCU 16 calculates a correction time $t_{x1}$ for a duty factor variation $\Delta D1$ ($=D1-D0$) according to a duty factor/correction time characteristic curve which, resembling the one shown in FIG. 26, is previously set for each solenoid valve. Then, the TCU 16 corrects the duty factor of the solenoid valve for 100% (0% for the normally-open solenoid valve) during a compression cycle period (including m number of cycles), starting from the instant that the D1-command is delivered, and delivers a driving signal such that the solenoid valve is operated with the corrected duty factor (during the period between times t50 and t51 of FIG. 27). The number m, which is a positive integer, is given as follows:

$$0 < t_{x1} - 28.6 \times m < 28.6 \quad (27)$$

Subsequently, the TCU 16 calculates, according to the following equation (28), a duty factor $D_{m+1}$ for the normally-closed solenoid valve, which corresponds to the (m+1)th cycle from the D1-command output time, and delivers a driving signal such that the solenoid valve is operated with the duty factor $D_{m+1}$ (during the cycle period between times t51 and t53 of FIG. 27). $D_{m+1}$ is given by $$D_{m+1}=(t_r+t4)\div 28.6\times 100 \quad (28)$$

The duty factor $D_{m+1}$ for the normally-open solenoid valve is calculated according to $$D_{m+1}=t_d\div 28.6\times 100 \quad (29)$$

In equations (28) and (29), $t_d$ and $t_r$ are given as follows:

$$t_d=(28.6-t_r)\times D1\div 100 \quad (30)$$

$$t_r=t_{x1}-28.6\times m \quad (31)$$

As is evident from the above description, the duty factor of the normally-closed solenoid valve is corrected for 100% (0% for the normally-open solenoid valve) during the period $t_{x1}$ from the command output time. When the pressure of the operating oil supplied to the clutch attains a level corresponding to the D1-command, after the termination of the period $t_{x1}$, the duty factor is adjusted corresponding to the command value D1. In this case, a driving signal corresponding to the remaining period $t_r$, equivalent to the difference between the time $t_{x1}$ and the valve opening period ($28.6\times m$) up to the end of the mth cycle, is delivered when the (m+1)th cycle is entered. The remaining period ($28.6-t_r$) of the (m+1)th cycle is regarded as one cycle period (corresponding to the period between times t52 and t53 of FIG. 27), and the solenoid valve is operated with the duty factor D1 during this one cycle time. During the (m+2)th cycle and the subsequent cycles, the normal driving signal is outputted with use of the duty factor D1 until the duty factor is changed.

In reducing the duty factor of the solenoid valve from D1 to D2 (in the case of operating oil pressure decrease), for example, on the other hand, the TCU 16 corrects the solenoid valve driving signal in the following manner.

First, if the value D2 is obtained as a result of the calculation of the duty factor of the solenoid valve, and when a command (D2-command) for the change of the duty factor from D1 to D2 is delivered (at time t60 of FIG. 27), the TCU 16 calculates a correction time $t_{x2}$ for a duty factor variation $\Delta D2$ (=D1−D2) according to the duty factor/correction time characteristic curve which, resembling the one shown in FIG. 26, is previously set for each solenoid valve. Then, the TCU 16 corrects the duty factor of the solenoid valve for 0% (100% for the normally-open solenoid valve) during a decompression cycle period (including n number of cycles), starting from the instant that the D2-command is delivered, and delivers a driving signal such that the solenoid valve is operated with the corrected duty factor (during the period between times t60 and t61 of FIG. 27). Like the number m, the number n, which is a positive integer, is given as follows:

$$0<t_{x2}-28.6\times n<28.6. \quad (32)$$

Subsequently, the TCU 16 calculates, according to the following equation (33) which is similar to equation (29), a duty factor $D_{n+1}$ for the normally-closed solenoid valve, which corresponds to the (n+1)th cycle from the D2-command output time, and delivers a driving signal such that the solenoid valve is operated with the duty factor $D_{n+1}$ (during the cycle period between times t61 and t63 of FIG. 27). $D_{n+1}$ is given by $$D_{n+1}=t_d\div 28.6\times 100 \quad (33)$$

The duty factor $D_{n+1}$ for the normally-open solenoid valve is calculated according to $$D_{n+1}=(t_r+t_d)\div 28.6\times 100 \quad (34)$$

In equations (33) and (34), $t_d$ and $t_r$ are given as follows:

$$t_d=(28.6-t_r)\times D2\div 100 \quad (35)$$

$$t_r=t_{x2}-28.6\times n \quad (36)$$

In the case of the operating oil pressure decrease, the duty factor of the normally-closed solenoid valve is corrected for 0% during the period between the command output time and the end of the nth cycle. When the (n+1)th cycle is entered (at time t61 of FIG. 27), the solenoid valve is opened directly with the duty factor $D_{n+1}$. After the duty factor is corrected for 0% during the period $t_r$ ($=t_{x2}-28.6\times n$) (terminating at time t62 of FIG. 27), directly following the start of the (n+1)th cycle, the remaining period ($28.6-t_r$) of the (n+1)th cycle may be regarded as one cycle period, as in the aforementioned case of the operating oil pressure increase, and the solenoid valve can be operated with the duty factor D2 during this one cycle time, with the same result. In this case, a counter for counting the period or time $t_r$ must be actuated when the (n+1)th cycle is entered, while a counter for counting the period $t_d$ must be actuated at the end of the period $t_r$. For this reason, this signal correction mode is inferior to the arrangement of the above described embodiment.

Figure 27:
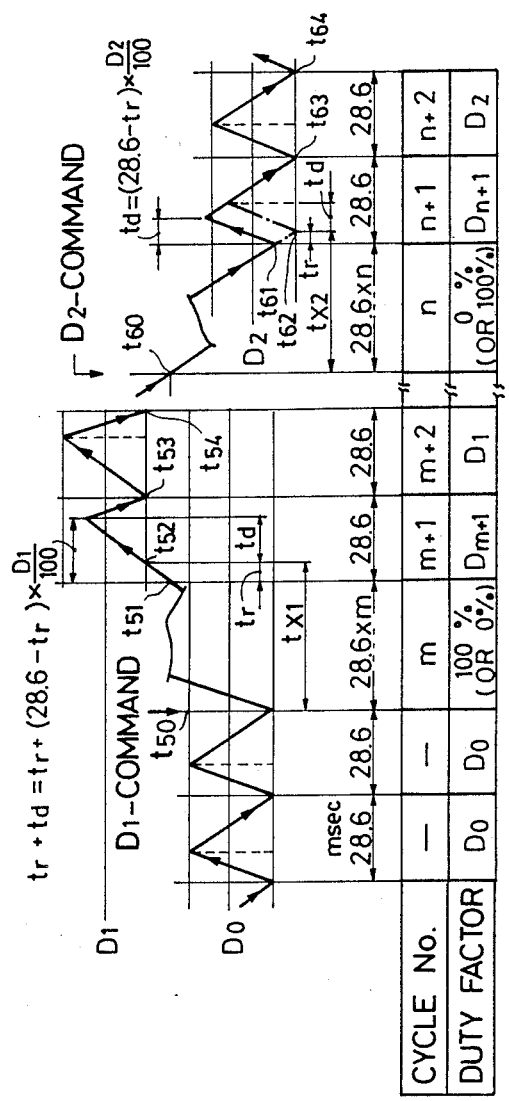
FIG. 27 is a timing chart for illustrating a time-based transition of a driving signal (duty factor) actually outputted as a result of solenoid valve driving signal correction when commands for the change of the duty factor of the solenoid valve from D0 to D1 and from D1 to D2 are delivered.
Figure 28:
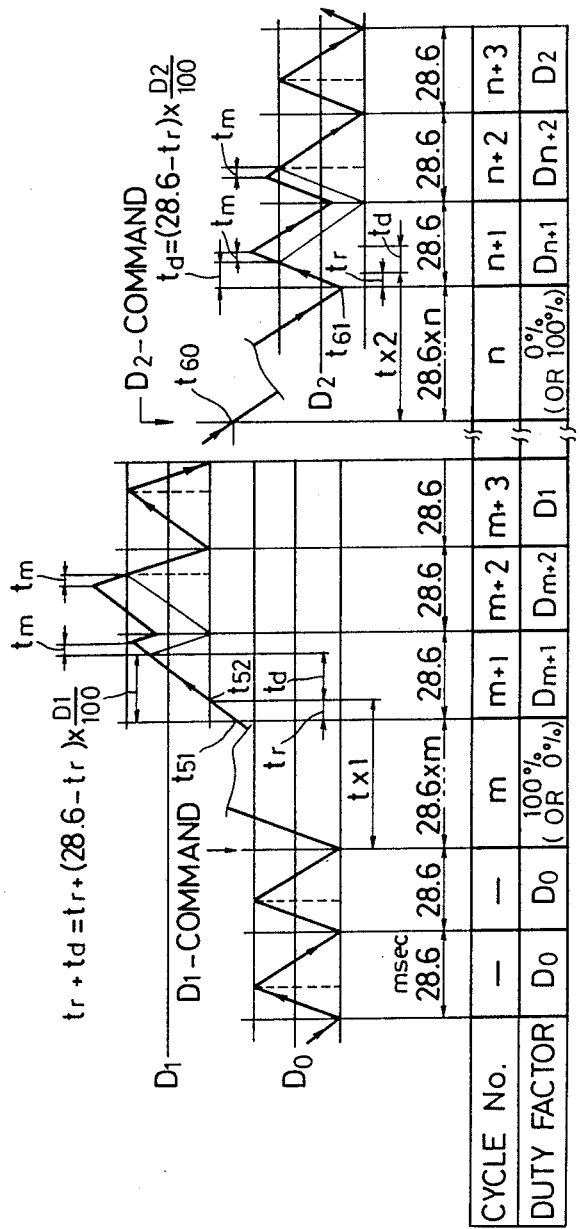
FIG. 28 is a timing chart similar to FIG. 27, showing alternative modes of the driving signal actually outputted as a result of the solenoid valve driving signal correction.

FIG. 28 shows another mode of solenoid valve driving signal correction. In changing the oil pressure supplied to the clutch, the condition of the oil pressure supply can be smoothly shifted from a transient state to a regular state by correcting the duty factor more finely than in the case shown in FIG. 27.

More specifically, after the D1-command is delivered, the solenoid valve is operated with the duty factor $D_{m+1}$ for an exciting period extended by $t_m$, during a cycle corresponding to the (m+1)th cycle of FIG. 27. During the next or (m+2)th cycle, the solenoid valve is operated with a duty factor $D_{m+2}$ for an exciting period shortened by $t_m$. During and after the (m+3)th cycle, the solenoid valve is operated with the target duty factor D1.

If the D2-command for the supply of a lower oil pressure to the clutch is delivered, on the other hand, the solenoid valve is operated with the duty factor $D_{n+1}$ for an exciting period extended by $t_m$, during a cycle corresponding to the (n+1)th cycle of FIG. 27. During the next or (n+2)th cycle, the solenoid valve is operated with a duty factor $D_{n+2}$ for an exciting period shortened by $t_m$. During and after the (n+3)th cycle, the solenoid valve is operated with the target duty factor D2.

Figure 29:
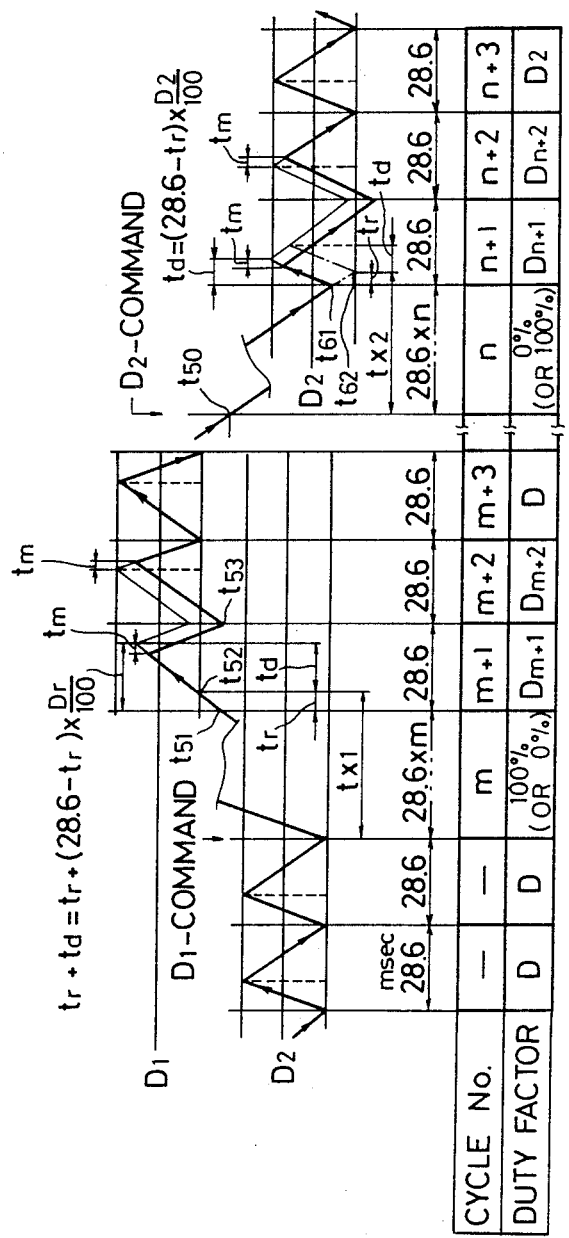
FIG. 29 is a timing chart similar to FIG. 27, showing further modes of the driving signal.

In some cases, the solenoid valve may be operated with the duty factor $D_{m+1}$ for the $t_m$-shortened exciting period, during a cycle corresponding to the (m+1)th cycle of FIG. 27, as shown in FIG. 29. In this case, the solenoid valve is operated with the duty factor $D_{m+2}$) for the $t_m$-extended exciting period, during the next or (m+2)th cycle. During and after the (m+3)th cycle, moreover, the solenoid valve is driven with the target duty factor D1. Also if the D2-command for the supply of the lower oil pressure to the clutch is delivered, the solenoid valve may be operated with the duty factor $D_{n+1}$ for the $t_m$-shortened exciting period, during the cycle corresponding to the (n+1)th cycle of FIG. 27. During the next or (n+2)th cycle, in this case, the solenoid valve is operated with the duty factor $D_{n+2}$ for the $t_m$-extended exciting period. During and after the (n+3)th cycle, the solenoid valve is operated with the target duty factor D2.

Figure 30:
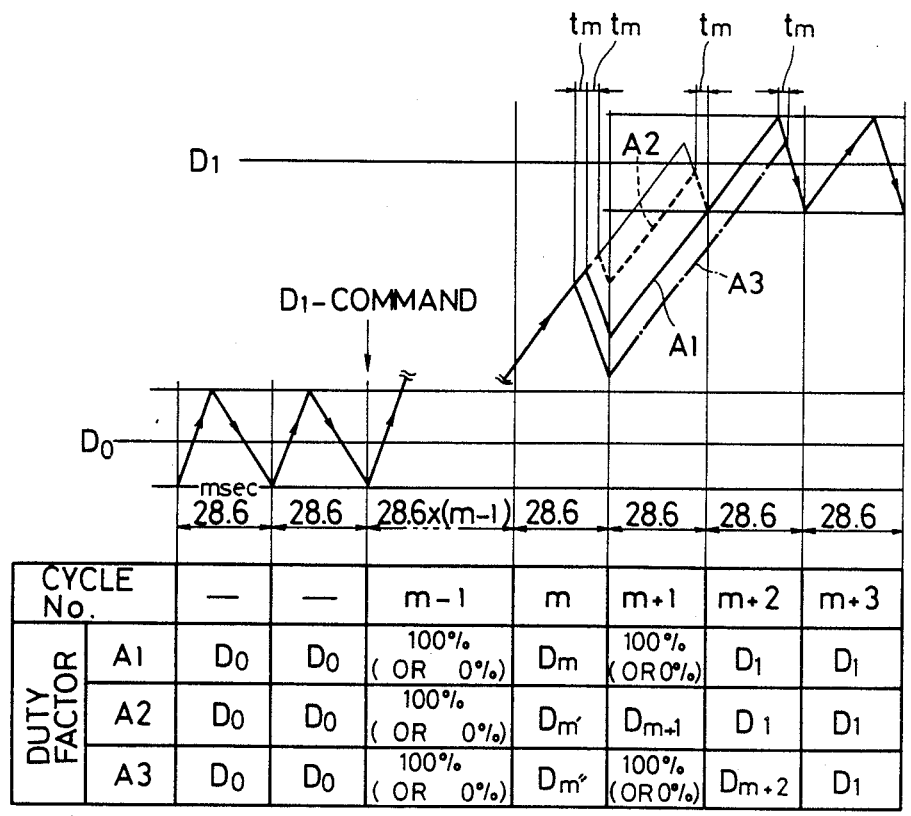
FIGS. 30 and 31 are timing chart similar to FIG. 27, showing still further modes of the driving signal.
Figure 31:
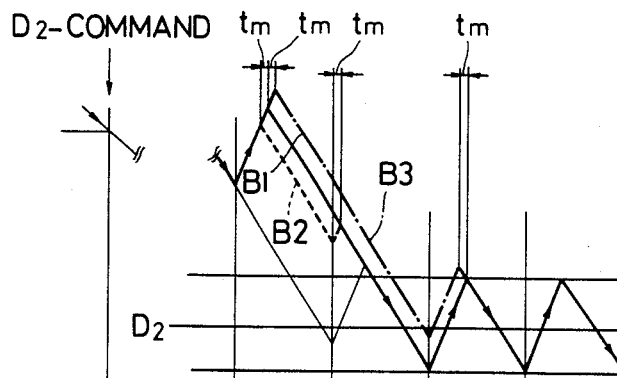

FIGS. 30 and 31 show different modified modes of solenoid valve driving signal correction. In changing the duty factor from 100% (0% for the normally-open valve) to D1 during a cycle corresponding to the (m+2)th cycle of FIG. 27, as indicated by thick full line A1 in FIG. 30, the solenoid valve is first driven with a duty factor $D_m$ during the last-but-one cycle m, and then with the 100% duty factor again during the (m+1)th cycle. Also by doing this, the oil pressure can be changed smoothly.

Alternatively, the solenoid valve may be operated with the target duty factor D1 after it is operated with duty factors $D_m'$ and $D_{m+1}'$, which are lower than 100% (higher than 0% for the normally-open valve), during the mth and (m+1)th cycles, respectively, as indicated by thick broken line A2 in FIG. 30. In this case, the solenoid valve can be operated with the duty factor D1 during the (m+2)th cycle, if the duty factor is set so that the exciting period of the solenoid valve is longer than the one indicated by line A1 in FIG. 30 by $t_m$ during the mth cycle, and that the nonexciting period of the valve is just as long as $t_m$ during the (m+1)th cycle.

Alternatively, moreover, the exciting period of the solenoid valve may be made shorter than the one indicated by line A1 by $t_m$ during the mth cycle, as indicated by thick dashed line A3 in FIG. 30. In this case, the solenoid valve is operated with the 100% duty factor again during the (m+1)th cycle, with the duty factor $D_{m+2}$ for the $t_m$-extended exciting period during the (m+2)th cycle, and with the duty factor D1 during the (m+3)th cycle.

As shown in FIG. 31, the duty factor may be changed into a lower value in various modes similar to the ascending modes shown in FIG. 30. As indicated by thick full line B1 in FIG. 31, the solenoid valve is operated with a duty factor $D_n$, which is higher than 0% (lower than 100% for the normally-open valve), during a cycle corresponding to the nth cycle of FIG. 27, with the 0% duty factor again during the (n+1)th cycle, and with the target duty factor D2 during the (n+2)th cycle. According to the mode indicated by thick broken line B2, the solenoid valve is operated with the target duty factor D2 after it is operated with duty factors $D_n'$ and $D_{n+1}'$, which are higher than 0% (lower than 100% for the normally-open valve), during the nth and (n+1)th cycles, respectively. Alternatively, the exciting period of the solenoid valve may be made longer than the one indicated by line B1 by $t_m$ during the nth cycle, as indicated by thick dashed line B3. In this case, the solenoid valve is operated again with the 0% duty factor during the (n+1)th cycle, with the duty factor $D_{n+2}$ for the $t_m$-shortened exciting period during the (n+2)th cycle, and with the duty factor D2 during the (n+3)th cycle.

In the aforementioned various modes of driving-signal correction for the solenoid valve shown in FIGS. 28 to 31, the adjustment period $t_m$ may be set to a suitable value for the smooth shift of the oil pressure supply condition from the transient state to the regular state, for the change of the duty factor, depending on various parameters, such as the hydraulic capacity of the clutch or other hydraulically-operated load device, pipe length, etc.

The following is a description of processes for correcting the driving signal when a new duty factor change is made before the end of driving signal correction based on the preceding duty factor change.

Figure 32:
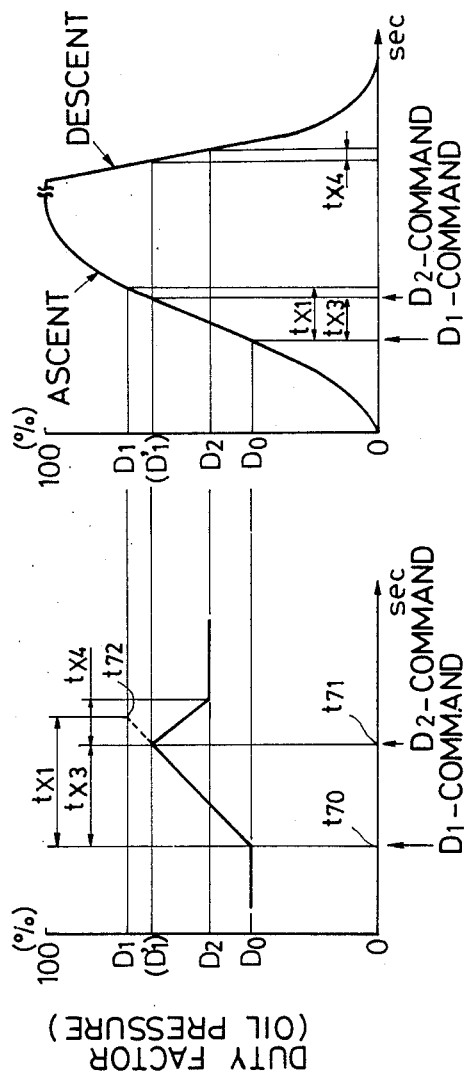
FIGS. 32(a) and 32(b) are graphs for illustrating a method of driving signal correction for a case such that a new duty factor change command is delivered before the end of driving signal correction based on the preceding duty factor change command.

Let it be supposed that the D1-command for the change of the duty factor from D0 to D1 is delivered at time t70, and the D2-command for the change from D1 to D2 is newly delivered at time t71 directly preceding t72 at which the operating oil pressure corresponding to the duty factor D1 is obtained, as shown in FIG. 32(a). In such a case, the TCU 16 first detects a time interval $t_{x3}$ between times t70 and t71, at which the D1- and D2-commands are delivered, respectively, and obtains a duty factor D1' corresponding to the operating oil pressure at the end of the interval $t_{x3}$, i.e., at time t71 for the delivery of the D2-command, according to the duty factor/correction time correction curve of FIG. 32(b). Considering the D2-command for the change for the duty factor D2 to have been delivered at the time of the delivery of a driving signal for the duty factor D1', a correction time $t_{x4}$ for the change of the duty factor from D1' to D2 is calculated. Using the correction time $t_{x4}$, the solenoid valve driving signal may be corrected according to relations (27) to (31) if the D2-command is intended for the increase of the operating oil pressure, or according to relations (32) to (36) if the D2-command is intended for the decrease of the operating oil pressure.

After the D2-command is delivered, moreover, only the aforesaid correction should be repeated even when another command for correction is delivered before the correction of the solenoid valve driving signal responsive to the D2-command is finished.

This mode of correction of the solenoid valve driving signal can be applied to all the cases of solenoid valve driving signal output, except the case of the aforementioned initial pressure supply control (e.g., at the time of the delivery of the driving signal for the solenoid valve 48 during the period between times t1 and t2 of FIG. 13(c)).

Figure 33:
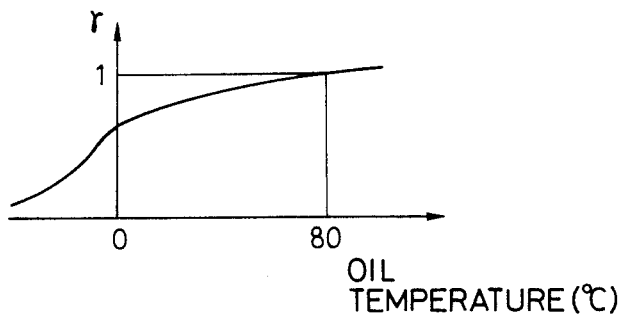
FIG. 33 is a graph showing the relationship between the temperature correction factor $\gamma$ and the oil temperature.

The duty factor/correction time characteristic curves of FIGS. 26 and 32(b) are based on a predetermined reference level (e.g., 80° C.) of the operating oil temperature. Even though the operating oil temperature is deviated from the reference level, the correction of the solenoid valve driving signal can be accurately effected by correcting the temperature as follows:

$$(t_x)_{toil} = (t_x)_{80}/\gamma \qquad (37)$$

where $(t_x)_{toil}$ is a solenoid valve driving signal correction time corresponding to an operating oil temperature $t_{oil}$ (° C.) detected by means of the oil temperature sensor 19, $(t_x)_{80}$ is a solenoid valve driving signal correction time obtained from the duty factor/correction time characteristic curve based on the predetermined reference temperature (80° C.), and $\gamma$ is a temperature correction factor. The correction factor $\gamma$ is set according the temperature correction factor table of FIG. 33, depending on the operating oil temperature $t_{oil}$.

Thus, even though the duty factor of the solenoid valve is changed by the solenoid valve driving signal correction, the oil pressure responsiveness can be improved considerably.

In connection with the above embodiment, only the processes of hydraulic control operation for the transmission control or shift between the first and second gear ratio modes have been described herein for simplicity of illustration. It is to be understood, however, that processes of hydraulic transmission control operation for any other combination of transmission gear ratio modes, e.g., for shift between second and third gear ratio modes, can be explained in like manner.

In the embodiment described above, moreover, the hydraulic clutches are used as the frictional engagement elements for transmission control. Alternatively, however, transmission control brakes may be used for this purpose.

According the above described embodiment, furthermore, the hydraulic control method for a transmission control apparatus is applied to an automatic transmission control apparatus with a torque converter. The driving force transmission apparatus is not, however, limited to a fluid coupling, such as the torque converter, or a slip-type direct-coupled clutch, such as the damper clutch 28. Various other transmission apparatuses may be used for this purpose, provided they can substantially determinately set the transmission torque from the rotating speed of an input or output shaft, or can externally control the transmission torque so that control parameter values corresponding to the transmission torque can be detected. These available transmission apparatuses include a slip-controlled electromagnetic-powder clutch, viscous clutch, etc., for example.

What is claimed is:

1. In a hydraulic control method that includes changing duty ratio, for introducing pressurized oil into an oil passage connected to a hydraulically-operated load device, from a first duty ratio corresponding to a first oil pressure value to a second duty ratio corresponding to a second oil pressure value, thereby changing the time-based average oil pressure inside said oil passage from the first oil pressure value to the second oil pressure value greater than said first oil pressure value, the improvement comprising:

changing said duty ratio from said first duty ratio to said second duty ratio via a third intermediate duty ratio corresponding to a third oil pressure value which is greater than said second oil pressure value; and maintaining said third intermediate duty ratio for a period of m cycles from issuance of a command of changing said first duty ratio to said second duty ratio, wherein m is an integer and satisfies the following relations:

$0 < t \times 1 - $(single duty cycle time)$ \times m < $(single duty cycle time);

wherein $t \times 1$ denotes a correction time which is obtained as corresponding to a duty ratio variation ($\Delta D1$) between said first duty ratio and said second duty ratio by using a predetermined duty ratio-correction time characteristic curve, said duty ratio-correction time characteristic curve representing the relation between a duty ratio variation and a time which is required for oil pressure in the oil passage to vary from a value corresponding to a duty ratio obtained before the duty ratio variation to a value corresponding to a duty ratio obtained after the duty ratio variation, by supplying said oil passage with oil pressure corresponding to said third intermediate duty ratio.

2. The hydraulic control method according to claim 1 wherein:

after changing the duty ratio from said first duty ratio to said third duty ratio, the pressurized oil is introduced into said oil passage at a fourth duty ratio corresponding to a fourth oil pressure value, the pressurized oil being introduced into said oil passage at said second duty ratio after said fourth duty ratio; and said fourth duty ratio is a duty ratio which is set for a (m+1)th cycle from the issuance of the command of changing the duty ratio and whose value is calculated on the basis of the correction time $t \times 1$.

3. The hydraulic control method according to claim 2, comprising detecting temperature of the pressurized oil, and correcting said duty ratios in accordance with said detected temperature.

4. In a hydraulic control method that includes changing duty ratio, for introducing pressurized oil into an oil passage connected to a hydraulically-operated load device, from a first duty ratio corresponding to a first oil pressure value to a second duty ratio corresponding to a second oil pressure value, thereby changing the time-based average oil pressure inside said oil passage from a first oil pressure value to a second oil pressure value smaller than said first oil pressure value, the improvement comprising:

changing said duty ratio from said first duty ratio to said second duty ratio via a third intermediate duty ratio corresponding to a third oil pressure value which is smaller than said second oil pressure value; and maintaining said third intermediate duty ratio for a period of n cycles from issuance of a command of changing said first duty ratio to said second duty ratio, wherein n is an integer and satisfies the following relations:

$0 < t \times 2 - $(single duty cycle time)$ \times n < $(single duty cycle time);

wherein $t \times 2$ denotes a correction time which is obtained as corresponding to a duty ratio variation ($\Delta D2$) between said first duty ratio and said second duty ratio by using a predetermined duty ratio-correction time characteristic curve, said duty ratio-correction time characteristic curve representing the relation between a duty ratio variation and a time which is required for oil pressure in the oil passage to vary from a value corresponding to a duty ratio obtained before the duty ratio variation to a value corresponding to a duty ratio obtained after the duty ratio variation, by supplying said oil passage with oil pressure corresponding to said third intermediate duty ratio.

5. The hydraulic control method according to claim 4, wherein:

after changing the duty ratio from said first duty ratio to said third duty ratio, the pressurized oil is introduced into said oil passage at a fourth duty ratio corresponding to a fourth oil pressure value, the pressurized oil being introduced into said oil passage at said second duty ratio after said fourth duty ratio; and said fourth duty ratio is a duty ratio which is set for a (n+1)th cycle from the issuance of the command of changing the duty ratio and whose value is calculated on the basis of the correction time t×2.

6. The hydraulic control method according to claim 4, comprising detecting temperature of the pressurized oil, and correcting said duty ratios in accordance with said detected temperature.

* * * * *